PUMPING SYSTEM ANALOGUE

Filed Jan. 8, 1951 6 Sheets-Sheet 1

INVENTOR.
F. W. BUBB

BY

Hudson & Young
ATTORNEYS

Dec. 8, 1953 F. W. BUBB 2,661,898

PUMPING SYSTEM ANALOGUE

Filed Jan. 8, 1951 6 Sheets-Sheet 2

INVENTOR.
F. W. BUBB

BY

Hudson & Young

ATTORNEYS

Dec. 8, 1953 F. W. BUBB 2,661,898

PUMPING SYSTEM ANALOGUE

Filed Jan. 8, 1951 6 Sheets-Sheet 3

UNIT 2

UNIT 1

INVENTOR.
F. W. BUBB

BY

Hudson & Young

ATTORNEYS

INVENTOR.
F. W. BUBB
BY
Hudson & Young
ATTORNEYS

UNIT 7

UNIT 8

UNIT 9

(8 → 1)

INVENTOR.
F. W. BUBB
BY
Hudson & Young
ATTORNEYS (6 —► 4)

(6 7 —► 4)

INVENTOR.
F. W. BUBB
BY
Hudson & Young
ATTORNEYS

Patented Dec. 8, 1953 2,661,898

UNITED STATES PATENT OFFICE 2,661,898

PUMPING SYSTEM ANALOGUE

Frank Wm. Bubb, Webster Groves, Mo., assignor to Phillips Petroleum Company, a corporation of Delaware Application January 8, 1951, Serial No. 204,926

15 Claims. (Cl. 235—61)

This invention relates to a simulator which is an electrical analogue of a pumping system. In one specific aspect, it relates to a simulator which is an electrical analogue of the tubing, sucker rod, oil column, and pump in a deep well pumping unit. In another specific aspect, it relates to a simulator which is an electrical analogue of the mechanism connecting a prime mover with the top or "polished" rod of a sucker rod pumping unit.

A typical deep well system includes a series or "string" of metal rods, referred to in the art as sucker rods, these rods extending through tubing positioned in the well, the lower end of the tubing carrying a pumping unit. The tubing, in turn, is suspended within a well casing, and, under some conditions, the lower portion of the interspace between the tubing and casing may contain a column of oil. At the top of the well, the sucker rod string extends through a stuffing box and is driven by a prime mover, such as an electric motor or an internal combustion engine, through a flywheel or "bull wheel" driven by the prime mover. This flywheel, in turn, drives a crank or counterbalance which is coupled through a walking beam to the top end of the sucker rod string.

As the pumping operation is carried out, a column of oil rises in the region between the tubing and the sucker rod string, thus producing a viscous drag both upon the tubing and sucker rod string. The weight and elasticity of the sucker rod string, as well as the tubing and oil column, produce elastic strains in the pumping unit so that the sucker rod string and tubing behave in a manner somewhat analogous to elongated springs.

This elastic movement of the sucker rod string and tubing oftentimes results in failure of one or more sucker rods and, more often, in inefficient operation of the pumping system. It has not been possible, in the past, to predict the effect of changes in various operating variables of the system with any degree of accuracy, except by purely empirical or "cut and try" methods, for the obvious reason that the movement of the sucker rod string several miles below the surface of the earth cannot be observed nor is it possible to observe the manner of operation of the downhole pump.

It has been proposed to provide a system of weights and springs to behave in the same manner as the pumping system but the difficulties of adjustment of various parts of the system and the difficulties in making the model itself can be demonstrated to be so great as to eliminate the practical possibility of constructing such apparatus.

It has also been proposed to construct an electrical system in which specified variables of the electrical system correspond to certain variables of the pumping system so that the electrical system is an analogue of the actual pumping system. It has, however, been assumed in such proposals that the oil could be subjected both to tension and compression whereas, in fact, it is not possible to place an oil column under tension. Accordingly, the results of such proposed systems do not fully represent the behavior of the actual pumping system. Moreover, such proposals have neglected the effect of the downhole apparatus upon the driving system which again leads to considerable difficulty for the downhole system has a definite reaction upon the driving system which cannot be neglected if accurate results are to be obtained.

It is an object of the invention to provide an improved electrical system which is an analogue of an actual well pumping unit, which system may be utilized to predict the effect of changing various operating conditions of the pumping system.

It is a further object to provide apparatus for simulating the behavior of the driving mechanism interposed between the prime mover and the sucker rod string.

It is a still further object to provide apparatus which is reliable in operation, which utilizes standard circuit components, and is of the lowest cost commensurate with the complexity of the data obtained therefrom.

Various other objects, advantages and features of the invention will become apparent from the following detailed description taken in conjunction with the accompanying drawings, in which.

Figures 12 to 20, inclusive, are schematic circuit diagrams of circuits for producing voltages corresponding to the differential equations of motion of various parts of the drive mechanism; and Figures 21 to 25, inclusive, are schematic diagrams of circuits for coupling the circuit equation units of Figures 12 to 20, inclusive.

Figures 1, 2, 3, 4, 5:
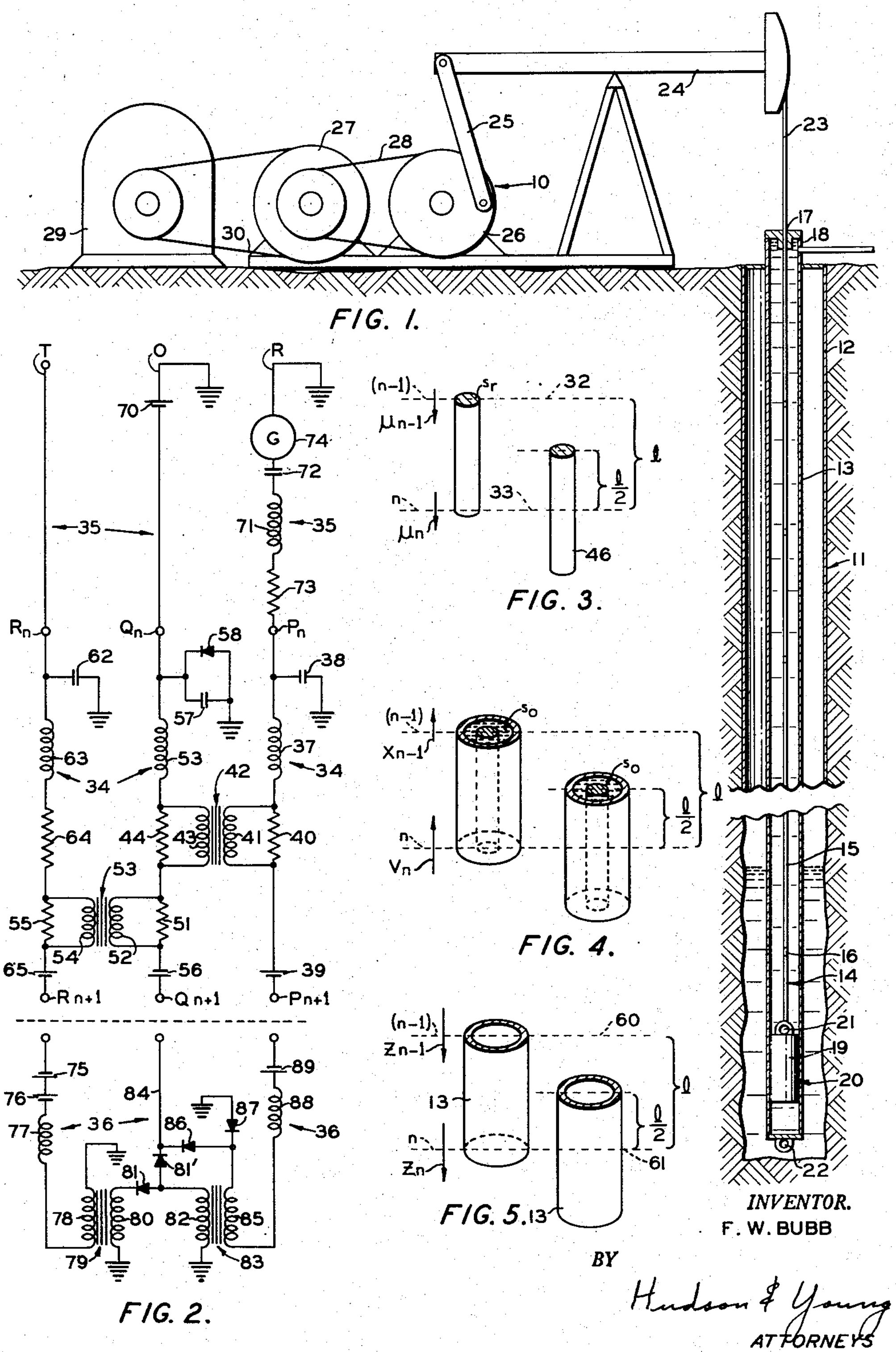
Figure 1 is a vertical sectional view, partially in elevation, of a typical deep well pumping system.
Figure 2 is a schematic circuit diagram of an electrical simulator for the downhole pumping apparatus.
Figures 3, 4 and 5 are views explaining the derivation of the differential equations of motion of sucker rod, tubing and oil column.

Referring now to Figure 1, I have illustrated, in a schematic manner, a typical deep well pumping system to which the simulator of this invention is applicable, this system including driving mechanism 10 located at the surface and a downhole pumping unit 11. The unit 11 includes the usual well casing 12 within which is mounted tubing 13 having a sucker rod string 14 mounted therein. The string 14 includes a number of sucker rods 15 connected together by joints 16, the upper end of the string extending through a stuffing box 17 in a casinghead 18 and the lower end being attached to a plunger 19 forming a part of a pump 20 which includes an upper or traveling valve 21 and a bottom or stationary valve 22. The uppermost sucker rod or "polished" rod 23 is driven by the mechanism 10 which includes a walking beam 24 having one end secured to the polished rod and its other end secured to a pitman 25 which is driven by a crank or counter-balance 26. The crank is driven by a flywheel 27, as through a chain drive 28, and the flywheel, in turn, is driven by a prime mover 29, as by a second chain drive 30. The prime mover 29 may be an electric motor, an internal combustion engine, or any other suitable type of engine.

In accordance with the invention, the operation of the downhole unit 11 and the drive mechanism 10 is electrically simulated by the apparatus of my invention. The apparatus of Figure 2 will be described first and this apparatus simulates the behavior of the downhole unit 11. The voltage at various parts of the electrical system represents stress at corresponding parts of the pumping unit, the charge at various points of the electrical system represents displacement of corresponding parts of the actual pumping system, and current in the electrical system represents the velocity of corresponding parts of the mechanical system. In order for the two systems to be analogues of each other, it is necessary that the differential equations describing the behavior of the electrical system be of similar form to the differential equations describing the behavior of the actual pumping unit. Thereupon, by suitably adjusting the coefficients of various terms of the electrical system, as by changing the parameters of various parts of the electrical system, a condition is obtained whereby the electrical potentials, charges, voltages and other parameters of the electrical system correspond to the stress, displacement, velocity and other corresponding variables of the pumping unit. At this time, the two systems are analogues of each other and further changes in the parameters of the electrical system produce effects thereon which enable accurate prediction of the effects of corresponding charges in the pumping unit.

In the simulator, an electrical line or network T represents the tubing 13, an electrical line O represents the oil column and an electrical line R represents the sucker rod string 15. The subscripts of the symbols represent the line of the circuit to which they are applicable such as the tubing, oil or rod line. The following notation is used in the differential equations just referred to, each equation being given both in its dimensionless and regular form, the dimensionless variables being indicated by placing a bar over the symbol for the variable. It will be understood that each variable is thus represented by a pure number, indicated by the barred letter, multiplied by an appropriate combination of fundamental units which, for the pumping unit, are time, length and force, and which, for the electrical system, are time, voltage and charge, convenient units for these variables being selected as set forth in the first part of the following table, the remainder of the table indicating the notation to be used hereinafter.

| | |
|---|---|
| $v$—Prime mover frequency or revolutions per second. | $\Omega$—Equivalent driving voltage on circuit simulating the engine. |
| $l$—Length of segment of rod, tube or oil. | $\mu$—Circular frequency of driving voltage. |
| Unit of force—Force required to stretch a sucker rod segment by an amount P. | $\psi$—Maximum voltage applied to R line by generator. |
| | $\tau$—Charge required to raise voltage of a condenser of capacitance $\frac{1}{E}$ to a value $\psi$. Thus, $\psi=E\tau$. |
| $e_r, e_o, e_t$—Elastic modulus of the sucker rod, oil and tube, respectively. | $E_r, E_o, E_t$—Reciprocal of capacity of the rod line, oil line and tubing line condensers, respectively. |
| $s_r, s_o, s_t$—Cross sectional area of sucker rod, oil and tube, respectively. | |
| $m$—Equivalent inertia of pump engine. | $M$—Equivalent coefficient of self-induction of driving circuit. |
| $f$—Frictional coefficient of engine. | $F$—Resistance of driving circuit. |
| $h$—Positional constant for engine. | $H$—Reciprocal capacity of driving circuit. |
| $w_r, w_o, w_t$—Weight per unit length of sucker rod, oil and tube, respectively. | $J_r, J_o, J_t$—Electromotive force of batteries in rod, oil and tubing lines, respectively, simulating the weight of corresponding segments of these lines. |
| | $L_r, L_o, L_t$—Coefficient of self-induction of chokes in rod, oil and tubing lines, respectively, simulating inertia of corresponding segments of rod, oil and tube. |
| $w_p, w_b$—Weight of plunger and valve, respectively. | $W_p, W_b$—Electromotive force of batteries simulating weight of plunger and valve, respectively. |
| $k, k_1, k_2$—Viscous coefficient in expressions $k(u+v)$, $k_1(v+w)$, $k_2w$ giving viscous drag per unit length between sucker rod and oil, between oil column and tube, and between tube and oil surrounding tube, respectively. | $R, R_1, R_2$—Half the resistance in rod and oil lines, half the resistance in oil and tubing lines and resistance in tubing line, simulating viscous drag, in the expressions at the left. |
| $q_B$—Upward pressure on bottom of tube due to oil between tube and casing $(q=es\bar{q})$. | $Q_B$—Electromotive force of battery simulating upward pressure of oil on bottom of tube $(Q=\psi\bar{Q})$. |
| | $I_p$—Coefficient of self-induction of choke simulating inertia of plunger. |
| | $L_B$—Coefficient of self-induction of choke simulating inertia of valve end and tubing. |

$t$—Time $\left(t=\frac{\bar{t}}{v}\right)$.

$x_n$, $y_n$, $z_n$—Displacement of rod, oil, and tube, respectively ($x=l\bar{x}$; $y=l\bar{y}$; $z=l\bar{z}$).

$u_n$, $v_n$, $w_n$—Velocity of rod, oil, and tube, respectively ($u=vl\bar{u}$; $v=vl\bar{v}$; $w=vl\bar{w}$).

$a_n$, $b_n$, $c_n=\dot{u}_n$, $\dot{v}_n$, $\dot{w}_n$, respectively, time derivatives of velocity, or acceleration ($a=v^2l\bar{a}$; $b=v^2l\bar{b}$; $c=v^2l\bar{c}$).

$p_n$—Tension in rod line ($p=es\bar{p}$).

$q_n$—Compression of oil line ($q=es\bar{q}$).

$r_n$—Tension of tubing line ($r=es\bar{r}$).

$T$—Time $\left(T=\frac{1}{\mu}\bar{T}\right)$.

$X_n$, $Y_n$, $Z_n$—Charge upon condensers simulating displacement of rod, oil, and tube, respectively ($X_n=\tau\bar{X}_n$; $Y_n=\tau\bar{Y}_n$; $Z_n=\tau\bar{Z}_n$).

$U_n$, $V_n$, $W_n$—Current in rod, oil and tubing lines simuating velocity of rod, oil and tube ($U_n=\mu\tau\bar{U}_n$; $V_n=\mu\tau\bar{V}_n$; $W_n=\mu\tau\bar{W}_n$).

$A_n$, $B_n$, $C_n=\dot{U}_n$, $\dot{V}_n$, $\dot{W}_n$, respectively, time derivatives of velocity, or acceleration ($A_n=\mu^2\tau\bar{A}_n$; $B_n=\mu^2\tau\bar{B}_n$; $C_n=\mu^2\tau\bar{C}_n$).

$P_n$—Voltage in rod line simulating tension ($P=\psi\bar{P}$).

$Q_n$—Voltage simulating compression in oil line ($Q=\psi\bar{Q}$).

$R_n$—Voltage simulating tension of tubing line ($R=\psi\bar{R}$).

In the mathematical analysis of the pumping unit and electrical system which follows, the respective differential equations are first derived by the method of finite differences and, from each such equation, the corresponding dimensionless equation is derived and follows the basic equation. In accordance with the method of finite differences, the casing, tubing and sucker rod string are divided into a large number N of segments. During operation of the pumping unit, each segment of the sucker rod moves upward or downward in accordance with the mechanical laws governing the system.

In particular, considering the $n$th segment of the sucker rod, as defined by the dotted lines 32, 33, Figures 3, in an interval of time $\Delta t$, a volume of rod $su_n\Delta t$ passes out at the bottom of the segment, and a volume of rod $su_{n-1}\Delta t$ passes into the top of the segment with the result that a volume $s(u_n-u_{n-1})\Delta t$ is removed from the segment. Accordingly, in this interval of time $\Delta t$, there is an increment $\Delta p_n$ in tensile stress in accordance with the following equation:

$$\Delta p_n=\frac{s_r e_r(u_n-u_{n-1})\Delta t}{l};\ \overline{\Delta p_n}=(\bar{u}_n-\bar{u}_{n-1})\overline{\Delta t} \qquad \text{Eq. (1)}$$

This equation has its counterpart in the electrical system of Figure 2 wherein electrical circuit unit 34 represents the $n$th segment of the pumping unit, circuit element 35 represents the top of the pumping unit, and circuit unit 36 represents the pump at the bottom of the well. The segment 34 of the rod line includes an inductance 37 having a coefficient $L_r$ of self-induction simulating the inertia of the corresponding segment of the sucker rod. A grounded condenser 38 is attached to the portion 34 of the rod line and the reciprocal of the capacitance $E_r$ of this condenser represents the elasticity of the $n$th segment of the rod. The portion 34 of the rod line also includes a battery 39 of electromotive force $J_r$ together with a resistance 40 shunted by a winding 41 of a transformer 42, whose purpose will be hereinafter explained, the other winding 43 of this transformer being connected in shunt with a resistance 44 in the corresponding segment 34 of the oil line. In a time interval $\Delta T$ a charge $U_n\Delta T$ flows toward the segment 34 of the rod line, and a charge $U_{n-1}\Delta T$ flows away from this segment. As a result, there is an increment of charge $(U_n-U_{n-1})\Delta T$ upon the condenser 38. Since, as stated, the capacity of condenser 38 is $$\frac{1}{E_r}$$

the voltage at station point $n$ takes on the increment $$\Delta P_n=E_r(U_n-U_{n-1})\Delta T;\ \overline{\Delta P_n}=(\bar{U}_n-\bar{U}_{n-1})\overline{\Delta T} \qquad \text{Eq. (2)}$$

It will be noted that these two equations are of identical form and, upon comparing the dimensionless forms of these equations, the following relationships are obtained between the variables $p_n$, $u_n$ and $t$ of the pumping unit and the variables $P_n$, $U_n$, and $T$ of the electrical system, the symbol $\sigma$ denoting the time ratio $$\frac{v}{\mu}$$

and the symbol $\rho$ denoting the stiffness ratio $$\frac{E}{es}$$

$$p_n=\frac{P_n}{\tau\rho} \qquad \text{Eq. (3)}$$

$$u_n=\frac{\sigma l}{\tau}U_n \qquad \text{Eq. (4)}$$

$$t=\frac{T}{\sigma} \qquad \text{Eq. (5)}$$

In the pumping unit of Figure 1, the downward velocity of the oil at the $n$th station is $u_n$ and the upward velocity of the oil is $v_n$ with the result that there is an upward viscous drag upon the rod element of magnitude $k(u_n+v_n)$. From these data, the equation of motion of a rod segment 45 which straddles the segment between lines 32, 33 may be deduced, this segment extending distance $$\frac{l}{2}$$

above and below the $n$th station point. This segment has acting upon it a total tension $p_{n+1}$ on its bottom end, a total tension $p_n$ on its top end, the aforementioned upward viscous drag $$kl(u_n+v_n$$

and a downward weight $w_n$. The resulting force produces a downward acceleration $a_n$ at the upper end of this segment in accordance with the equation $$p_{n+1}-p_n=\frac{w_n l a_n}{g}+kl(u_n+v_n)-w_n l$$

$$\frac{es}{w_n l}(\bar{p}_{n+1}-\bar{p}_n)=\frac{v^2 l}{g}\bar{a}_n+\frac{klv}{w_n}(\bar{u}_n+\bar{v}_n)-1 \qquad \text{Eq. (6)}$$

In the electrical system of Figure 2, the voltage difference $P_{n+1}-P_n$ between the opposite ends of segment 34 of the rod line causes a current $U_n$ to flow. This current produces a voltage drop $L_rU_n=L_rA_n$ across the choke 37, the battery 39 produces an electromotive force $J_r$, and a voltage drop $RU_n$ is produced across resistance 40 which is coupled through transformer 42 with the oil line, this line, in turn, having a voltage drop of $RV_n$ across resistance 44. The action of this transformer produces a voltage drop across the parallel combination of the winding and resistance 40 which is equal to $R(U_n+V_n)$. Accordingly, the equation for the voltage drop between one end and the other end of segment 34 of the rod line is given by the following equation:

$$P_{n+1}-P_n=L_rA_n+R(U_n+V_n)-J_r$$

$$\frac{\psi}{J_r}(\overline{P}_{n+1}-\overline{P}_n)=\frac{L\mu^2\tau}{J_r}\overline{A}_n+\frac{R\mu\tau}{J_r}(\overline{U}_n+\overline{V}_n)-1 \qquad \text{Eq. (7)}$$

It will be noted that Equations 6 and 7 are of similar form and, upon comparing the coefficients and variables of the dimensionless forms of the equations, the following relationships are obtained between the coefficients and variables of the equations representing the electrical system and the equations representing the pumping unit of Figure 1.

$$J_r=w_rl\tau\rho \qquad \text{Eq. (8)}$$

$$L_r=\frac{w_rl^2\sigma^2\rho}{g} \qquad \text{Eq. (9)}$$

$$R=kl^2\sigma\rho \qquad \text{Eq. (10)}$$

$$v_n=\frac{\sigma l}{\tau}V_n \qquad \text{Eq. (11)}$$

$$a_n=\frac{A_n\sigma^2l}{\tau} \qquad \text{Eq. (12)}$$

Similar equations may be derived with respect to the compressive strain of the segments of the oil column and the motion of a general segment of the oil column. Thus, in a time interval $\Delta t$, a volume $s_ov_n\Delta t$, Figure 4, of oil flows upwardly into the bottom of the $n$th segment, a volume $s_ov_{n-1}\Delta t$ flows out at the top of the $n$th segment and an increment $s_o(v_n-v_{n-1})\Delta t$ is accumulated within the segment. This increment is compressed and produces an increase $\Delta q_n$ in the total oil pressure of an amount determined by the following equation.

$$\Delta q_n=s_oe_o(v_n-v_{n-1})\Delta t/l$$

$$\Delta\overline{q}_n=\frac{s_oe_o}{se}(\overline{v}_n-\overline{v}_{n-1})\Delta\overline{t} \qquad \text{Eq. (13)}$$

In segment 34 of the oil line, there is an inductance 53, a resistance 51 shunted by a winding 52 of a transformer 53, this transformer having a winding 54 which is connected in shunt with a resistance 55 in the tubing line, and a battery 56. The segment also includes a grounded condenser 57 connected to the oil line, this condenser being shunted by a rectifier 58. It will be evident, by analogy to the reasoning employed in connection with the rod line, that a charge accumulates on condenser 57 in an interval of time $\Delta T$ as set forth in the following equation.

$$\Delta Q_n=E_o(V_n-V_{n-1})\Delta T$$

$$\Delta\overline{Q}_n=\frac{E_o}{E}(\overline{V}_n-\overline{V}_{n-1})\Delta\overline{T} \qquad \text{Eq. (14)}$$

It will be noted that Equations 13 and 14 are of similar form and, upon comparing the coefficients of the dimensionless forms of the equations, the following relationships are obtained between the coefficients and variables of the equations representing the electrical circuit and the equations representing the pumping unit.

$$q_n=\frac{Q_n}{\tau\rho} \qquad \text{Eq. (15)}$$

$$E_o=s_oe_o\rho \qquad \text{Eq. (16)}$$

The equation of motion of the oil segment which extends a distance $$\frac{l}{2}$$

above and below the lower end of the $n$th oil segment, as is shown by Figure 4, is governed by the viscous drag on the oil due to the sucker rod movement which, as previously indicated, is $k(u_n+v_n)$ and the viscous drag on the oil due to the friction thereof against the tube, which is $k_1(v_n+w_n)$ both expressions representing drag per unit length. The bottom of this segment is subjected to the compressive force $q_{n+1}$ and the top of this segment is subjected to the compressive force $-q_n$. Finally, the weight of oil per unit length $w_o$ multiplied by the length $l$ must be considered in the equation of motion which, therefore, becomes $$q_{n+1}-q_n=w_olb_n/g+w_ol+kl(u_n+v_n)+k_1l(v_n+w_n)$$

$$\frac{es}{w_ol}(\overline{q}_{n+1}-\overline{q}_n)=\frac{v^2l}{g}\overline{b}_n+\frac{kvl}{w_o}(\overline{u}_n+\overline{v}_n)+\frac{k_1vl}{w_o}(\overline{v}_n+\overline{w}_n)+1 \qquad \text{Eq. (17)}$$

In the electrical system of Figure 2, the voltage difference $Q_{n-1}-Q_n$ between opposite ends of the segment 34 of the oil line causes a current $V_n$ to flow through this segment of the oil line. This produces a voltage drop $L_o\dot{V}_n=L_oB_n$ across inductance 53 and the battery 56 produces a voltage drop $J_o$. Furthermore, the aforesaid current produces a voltage drop $RV_n$ across resistance 44 which, by the interaction of transformer 42 with the voltage drop $RU_n$ across resistance 40 produces a net voltage drop across the shunted transformer winding 43 and resistance 44 of $$R(U_n+V_n)$$

The current also produces a voltage drop across resistance 51 of $R_1V_n$ while resistance 55 has a voltage drop $R_1W_n$ produced across it by current flow through the tubing line. Accordingly, the voltage drop across the shunted transformer winding 52 and resistance 51 is $R_1(V_n+W_n)$. The total voltage drop between the ends of segment 34 of the oil line is, of course, the total of all the voltages produced as just described, that is $$Q_{n+1}-Q_n=L_oB_n+R(U_n+V_n)+R_1(V_n+W_n)+J_o \qquad \text{Eq. (18)}$$

$$\frac{\psi}{J_o}(\overline{Q}_{n+1}-\overline{Q}_n)=\frac{L_o\mu^2\tau}{J_o}\overline{B}_n+\frac{R\mu\tau}{J_o}(\overline{U}_n+\overline{V}_n)+\frac{R_1\mu\tau}{J_o}(\overline{V}_n+\overline{W}_n)+1$$

It will be noted that Equations 17 and 18 of similar form and, equating the coefficients of these equations, the following relationships are attained between the coefficients and variables.

$$J_o=w_ol\tau\rho \qquad \text{Eq. (19)}$$

$$L_o=\frac{w_ol^2\sigma^2\rho}{g} \qquad \text{Eq. (20)}$$

$$R_1 = k_1 l^2 \sigma \rho \qquad \text{Eq. (21)}$$

$$w_n = \frac{\sigma l}{\tau} W_n \qquad \text{Eq. (22)}$$

It is known that the oil column cannot support a tensile stress. That is, although the oil can be and is compressed, it cannot be subjected to tension. Therefore, Equation 17 is subject to the restriction that $q$, the stress on the oil column, cannot become negative which would represent a tensile stress. This important limitation has not been taken into account prior to my invention, insofar as I am aware, and this limitation destroys the continuity of differential Equation 17 which practically makes impossible a mathematical solution of the equation. However, this limitation may be readily imposed upon the apparatus of Figure 2 and, to this end, I have connected rectifier 58 in shunt with the condenser 57. If the voltage $Q_n$ is positive, the rectifier 58 is inoperative and the segment 34 of the oil line simulates the behavior of the oil column in the manner already described. However, the voltage at $Q_n$ cannot become negative since the rectifier 58 will not permit point $Q_n$ to reach a potential which is less than ground potential. As a result, the segment 34 accurately portrays the actual behavior of the oil column in that the column can be subjected to compressive stress but not to tensile stress. This limitation is expressed mathematically by the following restrictions upon Equations 17 and 18.

$$q_n \nless 0;\ \bar{q}_n \nless 0;\ Q_n \nless 0;\ \bar{Q}_n \nless 0 \qquad \text{Eq. (23)}$$

The movement of the tubing is governed by generally the same equations as the movement of the sucker rod. Referring to Figure 5, and considering the $n$th segment of the tubing, as defined by dotted lines 60 and 61, a volume of tubing $s_t w_n \Delta t$ passes out of the bottom of the segment during an interval $\Delta t$, a volume of tubing $s_t w_{n-1} \Delta t$ passes into the top of the segment and, accordingly, in this interval, there is an increment in tensile stress in accordance with the following equation.

$$\Delta r_n = s_t e_t (w_n - w_{n-1}) \Delta t / l$$

$$\Delta \bar{r}_n = \frac{s_t e_t}{se} (\bar{w}_n - \bar{w}_{n-1}) \Delta \bar{t} \qquad \text{Eq. (24)}$$

This equation has its counterpart in the electrical system of Figure 2 in the segment 34 of the tubing line which includes between the points $R_n$ and $R_{n+1}$, a grounded condenser 62, an inductance 63, a fixed resistance 64, a battery 65, and the resistance 55 shunted by transformer winding 54. During an interval of time $\Delta T$ electrical charge $E_t W_n$ flows toward the $n$th segment and an electrical charge $E_t W_{n-1}$ flows away from the $n$th segment so that the accumulation of charge upon condenser 62 is given by the following equation:

$$\Delta R_n = E_t (W_{n-1}) \Delta T$$

$$\Delta \bar{R}_n = \frac{E_t}{E} (\bar{W}_n - \bar{W}_{n-1}) \Delta \bar{T} \qquad \text{Eq. (25)}$$

This equation being of similar form to Equation 24, the following relationships hold between the coefficients and variables of the dimensionless forms of the equations, as previously set forth:

$$r_n = \frac{R_n}{\tau \rho} \qquad \text{Eq. (26)}$$

$$E_t = s_t e_t \rho \qquad \text{Eq. (27)}$$

The equation of motion of the $n$th tube segment which extends a distance $$\frac{l}{2}$$

above and below the segment just mentioned is determined by the total tension $r_{n+1}$ at the bottom of the segment, the tension $r_n$ at the top of the segment, the viscous drag $k_1 l(v_n + w_n)$ produced by friction of the oil column against the tubing and an upward viscous drag $k_2 l w_n$ produced by oil or other fluid positioned between the casing and the tubing. This latter term need only be considered for the particular segments wherein oil is included between the casing and tubing. Accordingly, the equation of motion of this segment is as follows:

$$r_{n+1} - r_n = w_t l c_n / g + k_1 l (v_n + w_n) + k_2 l w_n - w_t l$$

$$\frac{es}{w_t l} (\bar{r}_{n+1} - \bar{r}_n) = \frac{v^2 l}{g} \bar{c}_n + \frac{k_1 v l}{w_t} (\bar{v}_n + \bar{w}_n) + \frac{k_2 v l}{w_t} \bar{w}_n - 1 \qquad \text{Eq. (28)}$$

In the electrical system of Figure 2, the voltage drop $R_n - R_{n+1}$ between the ends of segment 34 of the tubing line causes a current $W_n$ to flow through this segment of the line which produces voltage drops across inductance 63, battery 65, winding 54 connected in shunt with resistance 55, and fixed resistance 64 as respectively indicated in the following equation:

$$R_{n+1} - R_n = L_t C_n - J_t + R_1 (V_n + W_n) + R_2 W_n$$

$$\frac{\psi}{J_t} (\bar{R}_{n+1} - \bar{R}_n) = \frac{L_t \mu^2 \tau}{J_t} \bar{C}_n + \frac{R_1 \mu \tau}{J_t} (\bar{V}_n + \bar{W}_n) + \frac{R_2 \mu \tau}{J_t} \bar{W}_n - 1 \qquad \text{Eq. (29)}$$

The fixed resistance 64 is included only for those segments of the tubing wherein a stationary body of fluid is positioned between the casing and tubing. The following relationships between the pumping unit and electrical system follow from comparison of the dimensionless forms of Equations 28 and 29.

$$J_t = w_t l \tau \rho \qquad \text{Eq. (30)}$$

$$L_t = \frac{w_t l^2 \sigma^2 \rho}{g} \qquad \text{Eq. (31)}$$

$$c_n = C_n \sigma^2 l \qquad \text{Eq. (32)}$$

$$R_2 = K_2 l^2 \tau \rho \qquad \text{Eq. (33)}$$

In the foregoing description, it will be evident that the circuit unit 34 is an electrical analogue of any typical segment of the tubing, sucker rod string, and oil column. The actual pumping unit may be divided into as many segments as desired, each such segment being represented by a corresponding circuit unit 34 in the electrical system, the accuracy becoming greater with an increasing number of segments. In order to compensate for the fact that a finite difference analysis is accurate only up to an interval of one-half the element of extension, half-chokes $$\frac{L_r}{2}, \frac{L_o}{2}, \frac{L_t}{2}$$

not shown, may be inserted at the ends of the respective rod, oil and tubing lines.

As stated, the circuit thus far described simulates the sucker rod string together with its associated oil column and tubing. The simulator also includes the circuit unit 35 representing conditions at the top of the well and the circuit unit 36 representing conditions at the bottom of the well.

The top of the tubing string is anchored to the casing and to the ground so that it must remain stationary, that is, its displacement must be zero at all times. This condition is represented in the electrical circuit by leaving the tubing line unconnected at its top and so that no charge can accumulate. This condition is represented by the following equations:

$$z_0=0;\ Z_0=0 \qquad \text{Eq. (34)}$$

With respect to the oil line, the oil is discharged at the top of the tubing into a storage tank against a substantially constant head. That is, the pressure at the top of the oil line is constant. This condition is realized in the electrical system by inserting a battery 70 at the top of the oil line to simulate this end condition. This condition is represented by the following equations:

$$q_0=k_0;\ Q_0=K_0 \qquad \text{Eq. (35)}$$

The sucker rod string is driven at its top end by the drive mechanism which includes the prime mover, flywheel, crank and walking beam of Figure 1. Although I shall hereinafter disclose a simulator unit which takes into account the reaction of the sucker rod string upon the drive mechanism, which unit will be connected at the top of the rod line, for present purposes, the driving system may be assumed to be a positively acting mechanical system of one degree of freedom. The action of the drive mechanism upon the top of the sucker rod may, therefore, be represented by the following function, the terms of which represent, respectively, the resultant force applied to the top of the sucker rod, the lumped kinetic energy of the drive mechanism, the lumped potential energy of the drive mechanism, the dissipative function of the engine and the force or reaction which the sucker rod exerts upon the drive mechanism.

$$g(t)=ma_o+hy_o+fu_o+p_o(t)$$

$$\bar{g}=\frac{mv^2l}{es}\bar{a}_o+\frac{fvl}{es}\bar{u}_o+\frac{hl}{es}\bar{y}_o+\bar{p}_o \qquad \text{Eq. (36)}$$

For present purposes, it is assumed that the reaction of the sucker rod system upon the drive mechanism is negligible, which is true in certain practical applications and where results are desired only to a predetermined degree of accuracy, so that the motion at the top end of the sucker rod string may be expressed as a sinusoidal function. As indicated, the reaction of the sucker rod system upon the drive mechanism is taken into account when the simulator for the drive mechanism to be hereinafter described is connected at the top end of the sucker rod line.

In the electrical system, an inductance 71 provides for the kinetic energy of the drive mechanism, a condenser 72 provides for the potential energy thereof, a fixed resistance 73 provides for the dissipative function and a generator 74 produces the sinusoidal drive voltage. Thus, the behavior of the circuit elements representing the drive mechanism is represented by the following equation:

$$\Omega(T)=MA_o+FU_o+HY_o+P_o(T)$$

$$\bar{\Omega}=\frac{\mu^2\tau M}{\psi}\bar{A}_o+\frac{\mu\tau F}{\psi}\bar{U}_o+\frac{\tau H}{\psi}\bar{Y}_o+\bar{P}_o \qquad \text{Eq. (37)}$$

Comparison between the Equations 36 and 37 yields the following relationships between the parameters of the electrical system and pumping unit:

$$m=\frac{M}{\sigma^2\rho l} \qquad \text{Eq. (38)}$$

$$f=\frac{F}{\sigma\rho l} \qquad \text{Eq. (39)}$$

$$h=\frac{H}{\rho l} \qquad \text{Eq. (40)}$$

The end conditions for the bottom end of the pumping unit are determined by the nature of the pump used, its dimensions, and the material from which it is made. This downhole pumping unit is represented in the electrical system by the circuit unit 36. This unit includes, in the tubing line, batteries 75, 76 of opposite polarity connected in series with an inductance 77 and a winding 78 of a transformer 79. A second winding 80 of transformer 79 is connected to ground and through a rectifier 81 to a winding 82 of a transformer 83, the junction between winding 82 and rectifier 81 being connected through a rectifier 81' to a conductor 84 of the oil line. A second winding 85 of transformer 83 has one terminal connected through a rectifier 86 to conductor 84 and to ground through a rectifier 87 of opposite polarity, the other terminal of winding 85 being connected through an inductance 88 and a battery 89 to the lower end of the rod line.

Figure 6:
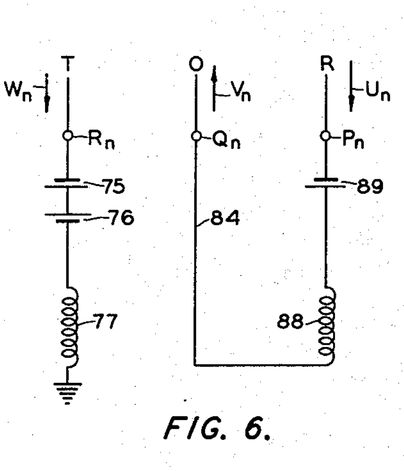
Figures 6 and 7 are schematic circuit diagrams of the lower circuit element of Figure 2 during the upstroke and downstroke periods.
Figure 7:
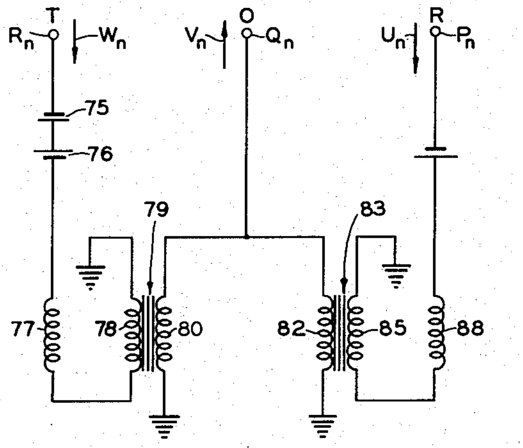

The arrangement of the rectifiers is such as to provide the circuit of Figure 6 during the period representing the upstroke of the pump and the circuit of Figure 7 during the period representing the downstroke of the pump.

Referring now to Figure 1, during the upstroke, the working valve 21 in the plunger is closed and the plunger lifts the oil column upwardly at its own velocity so that $v_N=u_N$. In Figure 6, the oil line is connected to the rod line through battery 89 and inductance 88 so that the following equation holds.

$$-U_N=V_N \qquad \text{Eq. (41)}$$

Furthermore, during the upstroke, the oil flowing into the working barrel 19, Figure 1, does not follow the plunger fast enough to exert appreciable pressure on its underside. The forces acting upon the plunger are, therefore, the weight of the plunger $w_p$, the upward tension $p_N$ in the rod and the downward pressure $q_N$ of the oil above the plunger. The following equation, accordingly, describes the motion of the plunger.

$$w_p+q_N-p_N=w_pa_N/g \qquad \text{Eq. (42)}$$

$$1+\frac{es}{w_p}(\bar{q}_N-\bar{p}_N)=\frac{v^2l}{g}\bar{a}_N$$

In Figure 6, the current flow through inductance 88 produces a voltage drop $L_pA_N$ and the battery 89 produces a voltage $W_p$, the sum of these voltages being equal to the difference in voltage $(Q_N-P_N)$ between the lower ends of the oil and rod lines. That is $$W_p+Q_N-P_N=L_pA_N$$

$$1+\frac{\psi}{W_p}(\bar{Q}_N-\bar{P}_N)=\frac{L_p\mu^2\tau}{W_p}\bar{A}_N \qquad \text{Eq. (43)}$$

The following relationships follow from comparison of the dimensionless forms of Equations 42 and 43.

$$W_p=w_p\tau\rho \qquad \text{Eq. (44)}$$

$$L_p=\frac{w_pl\sigma^2\rho}{g} \qquad \text{Eq. (45)}$$

The forces acting upon valve 22, Figure 1, are its weight $w_b$, the upward tension $r_N$ in the metal of the tube and total upward pressure $q_b$ on the bottom of the valve due to the tube of oil between the head and casing. The equation of motion of the valve is, therefore, as follows:

$$w_b - q_b - r_N = w_b c_N / g$$

$$1 - q_b/w_b - \frac{es}{w_b}\bar{r}_N = \frac{v^2 l}{g}\bar{c}_N \qquad \text{Eq. (46)}$$

In the circuit of Figure 6, the voltage $R_N$ is equal to the voltage $W_b$ of battery 75 minus the voltage $Q_b$ of battery 76 less the voltage drop $L_bC_N$ across inductance 77. That is, $$W_b - Q_b - R_N = L_b C_N$$

$$1 - \frac{Q_b}{W_b} - \frac{\psi}{W_b}\bar{R}_N = \frac{L_b \mu^2 \tau}{W_b}\bar{C}_N \qquad \text{Eq. (47)}$$

Comparison of the dimensionless forms of these equations yields the following relationships:

$$W_b = w_b \tau \rho \qquad \text{Eq. (48)}$$

$$L_b = \frac{w_b l \sigma^2 \rho}{g} \qquad \text{Eq. (49)}$$

$$Q_b = q_b \tau \rho \qquad \text{Eq. (50)}$$

Thus, during the upstroke, the transformers 79, 83 and rectifiers 81, 86 and 87 of Figure 2 produce a circuit condition corresponding to Figure 6 which, in turn, electrically simulates the motion of and forces acting upon the plunger, traveling valve 21, and fixed valve 22 of Figure 1.

During the interval of time representing the downstroke, the transformer 79, 83 and rectifiers 81, 86 and 87 of Figure 2 produce a circuit condition corresponding to Figure 7. The downward velocities of plunger 19 and the end of tube 13 being $u_N$ and $w_N$, respectively, a volume of oil $(s_r+s_o)(u_N-w_N)\Delta t$ is displaced upwardly through valve 21 during an interval of time $\Delta t$. This upwardly displaced oil occupies an equal volume $s_o(v_N+u_N)\Delta t$ in the column above the plunger. Accordingly, $$u_N s/s_o = v_N + w_N(s+s_o)/s_o \qquad \text{Eq. (51)}$$

In the circuit of Figure 7, the transformer 83 is wound with a turns ratio $$\frac{s_r}{s_o}$$

so that, when the voltage and current in winding 85 are $$-Q_n\frac{s_r}{s_o}$$

and $U_N$, respectively, the voltage and current in winding 82 are $Q_n$ and $$U_n\frac{s_r}{s_o}$$

The turns ratio for transformer 79 is $$\frac{(s_r+s_o)}{s_o}$$

so that, when the voltage and current in winding 80 are $Q_n$ and $$W_n\frac{(s_r+s_o)}{s_o}$$

respectively, the voltage and current in winding 78 are $$Q_n\frac{(s_r+s_o)}{s_o}$$

and $W_n$, respectively. The nodal equation for the junction $Q_n$ is therefore, $$U_N\frac{s_r}{s_o} = V_n + W_n\frac{s_r+s_o}{s_o} \qquad \text{Eq. (52)}$$

If the dimensionless forms of Equations 51 and 52 are derived and their coefficients compared, certain of the same relationships already derived will be obtained between the coefficients and variables of the two sets of equations. It will be further noted that the two equations are of similar form so that the circuit of Figure 7 accurately simulates the aforesaid end condition during the downstroke period.

Since oil passes freely through the valve 21 during the downstroke, the pressure intensity in the oil below and above plunger 19 is nearly equal. The cross-sectional area of oil in the barrel, however, exceeds that above the plunger in the ratio $$\frac{(s_r+s_o)}{s_o}$$

and, consequently, the upward force on the lower end of the plunger exceeds that on the upper end of the plunger by $$q_N\frac{s_r}{s_o}$$

Further, the plunger is subjected to the downward force of its weight $w_p$ and the tension $p_N$ in the sucker rod string. The equation of motion of the plunger during the downstroke is, therefore, $$w_p - q_N s/s_o - p_N = w_p a_N/g \qquad \text{Eq. (53)}$$

Similarly, in Figure 7, the branch equation for the line extending from $P_n$ to ground is as follows, upon consideration of the turns ratio of the transformers set forth in the discussion of Equation 51.

$$W_p - Q_n\frac{s_r}{s_o} - P_n = L_p\dot{U}_n \qquad \text{Eq. (54)}$$

It will be noted that Equations 53 and 54 are of the same form so that the electrical simulator accordingly portrays the movement of the plunger during the downstroke. If the dimensionless forms of these equations are derived and their coefficients are compared, certain of the relationships already obtained between the coefficients and variables of the two systems will be found to hold.

Further during the downstroke period, the forces acting upon stationary valve 22 are the weight of the valve $w_b$, the downward pressure $q_N$ of the oil in the barrel of the plunger, an upward pressure $q_b$ on the bottom of the valve head, and the tension $r_N$ in the metal at the end of the tube. This valve, accordingly, has the following equation of motion.

$$w_b - q_b + q_N - r_N = w_b c_N/g \qquad \text{Eq. (55)}$$

In Figure 7, the branch equation for the line extending from point $R_n$ to ground is as follows in consideration of the turns ratio of transformers 79 and 83.

$$W_b - Q_b - Q_n\frac{s_r+s_o}{s_o} - R_n = L_b\dot{W}_n \qquad \text{Eq. (56)}$$

It will be noted that Equations 55 and 56 are of the same form and, hence, the circuit accurately simulates the operation of valve 22 during the downstroke period. If the dimensionless forms of these equations are derived and their coefficients compared, certain of their relationships already derived will be found.

In the operation of the circuit, the circuit of Figure 2 is used to simulate conditions existing in an actual pumping installation. In this actual installation, most of the constants are known and these constants are utilized by substituting them in the equations previously derived to determine the corresponding parameters of similar parts of the electrical analogues of these constants. Before making these substitutions, the values of $\mu$, $v$, and E are assumed from which data $\sigma$ and $\rho$ may be readily calculated. In this connection it will be noted $$\rho=\frac{E}{es}$$

and that the cross sectional areas of various parts of the actual pumping system as well as their elastic modulus are known from which it follows that $\rho$ is readily calculated once a value for E is assumed. It is further necessary to assume a value for the segment length $l$ which may conveniently be the length of one section of the sucker rod string and, in the particular circuit shown by Figure 2, the equivalent driving voltage $\Omega$, and the maximum voltage $\psi$ are assumed quantities from which data the value of $\tau$ may be readily calculated from the equation $\psi=E\tau$. When the simulator hereinafter to be described is utilized to produce the driving voltage, the quantities $\Omega$, $\mu$, $\psi$, and $\tau$ are obtained by measurements of the simulator output. Once these constants have been assumed and calculated, as stated, the known constants of the actual pumping system are substituted in the equations to provide corresponding parameters for the constants of the electrical system. As an example of such substitution, referring to Equation 8, the weight $w_n$ of a unit length of sucker rod is known when the actual pumping system is constructed. The quantities $l$, $\tau$, $\rho$, are assumed or calculated as just indicated and, upon substitution of these values in Equation 8, the quantity $J_r$, that is, the electromotive force of a battery 39 in the rod segment is readily calculated. Similarly, with respect to Equation 9, since the weight of a rod segment $w_r$ is known and the quantities $l$, $\sigma$, $\rho$, and $g$ are known or calculated, the value $L_r$ of an inductance 37 in the rod line is readily calculated from Equation 9. In an entirely similar fashion, the parameters of the electrical system set forth in Equations 10, 16, 19, 20, 21, 26, 27, 30, 31, 33, 34, 35, 38, 39, 40, 44, 45, 48, 49 and 50 are readily calculated since the righthand side of each of these equations contains only the known or assumed quantities $l$, $v$, $\Omega$, $\psi$, $\mu$, $\tau$, $\sigma$, $\rho$ and $g$ which are assumed or calculated in the manner previously set forth together with a constant which is readily measurable or known on the actual pumping system. This enables the entire circuit of Figure 2 to be constructed, each component having a value as determined by the respective foregoing equations.

When this is done, the relationships set forth in Equations 3, 4, 5, 11, 12, 15, 22 and 32 hold between the variables of the electrical system and the variables of the actual pumping system. The values of the assumed quantities are then changed until the electrical system behaves in a manner analogous to the actual pumping system. Thereupon, the effect of any changes desired in the parameters of the mechanical system may be accurately predicted by noting the effect of corresponding changes on analogous electrical system. This enables operating conditions to be determined so that the dimensions and physical conditions of the actual pumping system are at an optimum to provide most efficient operation with resultant elimination of difficulties due to sucker rod breakage and malfunctioning of other parts of the apparatus.

Where all the necessary constants are not known in the actual system so that the corresponding electrical parameters of the electrical system are correspondingly unknown, the known values are used in the manner previously set forth to determine the constants of the corresponding parts of the electrical circuit. Reasonable values are assumed for the other known constants and corresponding values are set in the simulator by use of the aforementioned equation.

The simulator and its operations are then studied and conclusions are drawn as to the extent to which the performance depends on the unknown constants for which values had been assumed. Usually it will be found that some of these are critical. Others may lie anywhere within a fairly wide range without appreciable effect on the performance of the simulator. Also, operation of the simulator suggests measurements to be taken on the prototype which either will permit computation of those critical constants or will serve as indices to the performance of the prototype.

Figures 8, 10:
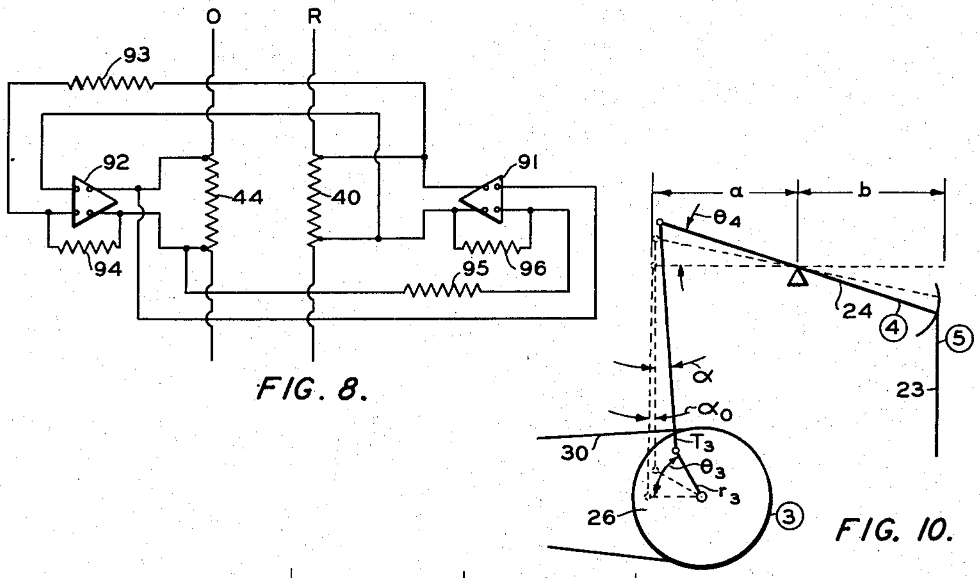
Figure 8 is a schematic circuit diagram of an amplifier system simulating an ideal transformer.
Figures 9 and 10 are schematic views of portions of the drive mechanism in its original position and in a general position, respectively.

In Figure 2, the transformers 42 and 53 of each segment were assumed to be ideal transformers having a perfect one-to-one coupling ratio. Where this assumption leads to any appreciable error, the transformers 42 and 53 may each be replaced by the unit shown in Figure 8 which provides, in effect, an ideal transformer. In this figure, the output of an operational amplifier 91 is applied across resistance 40 of a segment in the rod line and the output of an operational amplifier 92 is applied across resistance 44 in the oil line. The input of amplifier 92 is coupled to resistance 40 through an impedance 93 and amplifier 92 is provided with a feedback impedance 94. Similarly, the input of amplifier 91 is coupled to resistance 44 through an impedance 95 and this amplifier is provided with a feedback impedance 96. Each amplifier produces a powered output which reflects its input potential to the resistance 40 or 44 in the line to which the amplifier output is connected. However, the amplifier input does not draw appreciable current from the line to which its input circuit is connected. As a result, the circuit of Figure 8 is the full equivalent of transformer 42 of Figure 2 and has the advantage that no current is drawn from the lines by either of the input circuits.

I shall now describe a simulator unit for the drive mechanism 10 of Figure 1. When this circuit is used, it replaces the inductance 71, condenser 72, resistance 73 and generator 74 of Figure 2, the simulator producing a voltage output which is representative of the driving force applied to the top of the sucker rod string by the mechanism 10 and also taking into account the reaction of the downhole pumping system upon the drive mechanism.

In this simulator unit, an electrical network is provided which satisfies the differential equations and positional equations of the various parts of the drive mechanism 10. The notation utilized hereinafter has no relation to that previously used and is to be considered independently of the preceding description. For convenience, the following equations are referred to Figure 9, which is a schematic representation of the drive mechanism 10 of Figure 1. The motor armature is designated as rotor (1), the flywheel is designated as rotor (2) and the crank 26 is designated as rotor (3), the subscripts in the following notation system designating the rotor referred to. The following notation is utilized in the equations:

$J$=moment of inertia.
$F$=viscous friction coefficient.
$K$=spring constant for chain or belt.
$r$=radius of small sprocket or pulley.
$R$=radius of large sprocket or pulley.
$M$=motor torque (externally applied).
$\theta$=angle of rotation.
$\omega=\dot{\theta}$=velocity of rotation, time derivative of angle of rotation.
$\ddot{\theta}$=rotary acceleration, time derivative of rotary velocity.
$T$=tension.
$P$=tension in "polished" rod 23.

Figure 9:
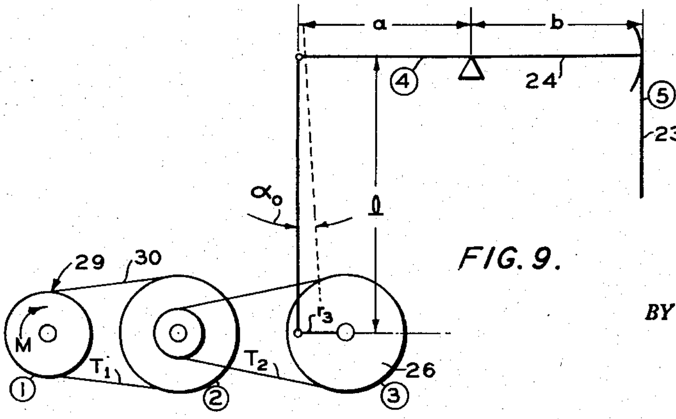

Certain dimensions are also shown on Figure 9.

The unbalanced torque on the armature of the motor is $M-T_1r_1$, and this overcomes the initial torque $J_1\ddot{\theta}_1$ and a friction torque $F_1\dot{\theta}_1$. Hence, $$M-T_1r_1=J_1\ddot{\theta}_1+F_1\dot{\theta}_1 \qquad \text{Eq. (57)}$$

Similarly, the rotary equations for the flywheel and crank are $$T_1R_2-T_2r_2=J_2\ddot{\theta}_2+F_2\dot{\theta}_2 \qquad \text{Eq. (58)}$$

$$T_2R_3-N=J_3\ddot{\theta}_3+F_3\dot{\theta}_3 \qquad \text{Eq. (59)}$$

where N is the torque on rotor (3) when its crank is in its general position, Figure 10, with the crank at an angle $$\theta_3$$

from its horizontal position. This counter-clockwise torque N on rotor (3) is given by $$N=r_3T_3\cos\alpha\cos\theta_3+r_3T_3\sin\alpha\sin\theta_3 \qquad \text{Eq. (60)}$$

The equation of motion of the walking-beam is $$aT_3\cos\alpha\cos\theta_4-aT_3\sin\alpha\sin\theta_4-bP=J_4\ddot{\theta}_4+F_4\dot{\theta}_4 \qquad \text{Eq. (61)}$$

The following equations express obvious geometrical relations between positions of crank, pitman, and walking-beam $$l\cos\alpha_0-l\cos\alpha=a\sin\theta_4-r_3\sin\theta_3 \qquad \text{Eq. (62)}$$

$$l\sin\alpha-\sin\alpha_0=r_3+a-r_3\cos\theta_3-a\cos\theta_4 \qquad \text{Eq. (63)}$$

Due to stretching of the chain by which the motor drives the flywheel, its length increases by $$r_1\theta_1-R_2\theta_2,$$

and this requires a tension $T_1$ given by $$T_1=K_1(r_1\theta_1-R_2\theta_2) \qquad \text{Eq. (64)}$$

where $K_1$ is an elastic constant. Similarly $$T_2=K_2(r_2\theta_2-R_3\theta_3) \qquad \text{Eq. (65)}$$

The last two equations represent the energy storage or spring action of the engine, similar effects for the pitman and elastic deflection of the walking-beam being considered negligible although these latter can be readily taken into account, if desirable.

Inspection of these nine equations shows that there are nine variables involved, namely, $\theta_1$, $\theta_2$, $\theta_3$, $\theta_4$, $\alpha$, N, $T_1$, $T_2$, $T_3$, where M and P are not included as unknowns because they represent external actions on the system and must, so far as the simulator is concerned, be given. Actually, P is supplied by the simulator for the pumping string and M must be applied by external means. Accordingly, there are sufficient equations to determine all the variables noted.

In accordance with the invention, each of the foregoing equations is rearranged so that a single variable appears at the righthand side of each equation it being immaterial how many variables appear at the lefthand side of each equation. These new equations are not mathematical solutions of the first equations since more than one variable appears in the lefthand side of the equations. These rearranged equations are as follows:

$$\frac{M-T_1r_1}{J_1p+F_1}=\omega_1 \qquad \text{Eq. (57A)}$$

$$\frac{T_1R_2-T_2r_2}{J_2p+F_2}=\omega_2 \qquad \text{Eq. (58A)}$$

$$\frac{T_2R_3-N}{J_3p+F_3}=\omega_3 \qquad \text{Eq. (59A)}$$

$$\frac{(J_4p+F_4)\omega_4+bP}{a\cos(\theta_4+\alpha)}=T_3 \qquad \text{Eq. (60A)}$$

$$T_3r_3\cos(\theta_3-\alpha)=N \qquad \text{Eq. (61A)}$$

$$\text{arc sin}\,\frac{1}{a}(l\cos\alpha_0-l\cos\alpha+r_3\sin\theta_3)=\theta_4 \qquad \text{Eq. (62A)}$$

$$\text{arc sin}\,\frac{1}{l}(l\sin\alpha_0+a+r_3-r_3\cos\theta_3-a\cos\theta_4)=\alpha \qquad \text{Eq. (63A)}$$

$$K_1(r_1\theta_1-R_2\theta_2)=T_1 \qquad \text{Eq. (64A)}$$

$$K_2(r_2\theta_2-R_3\theta_3)=T_2 \qquad \text{Eq. (65A)}$$

Figure 11:
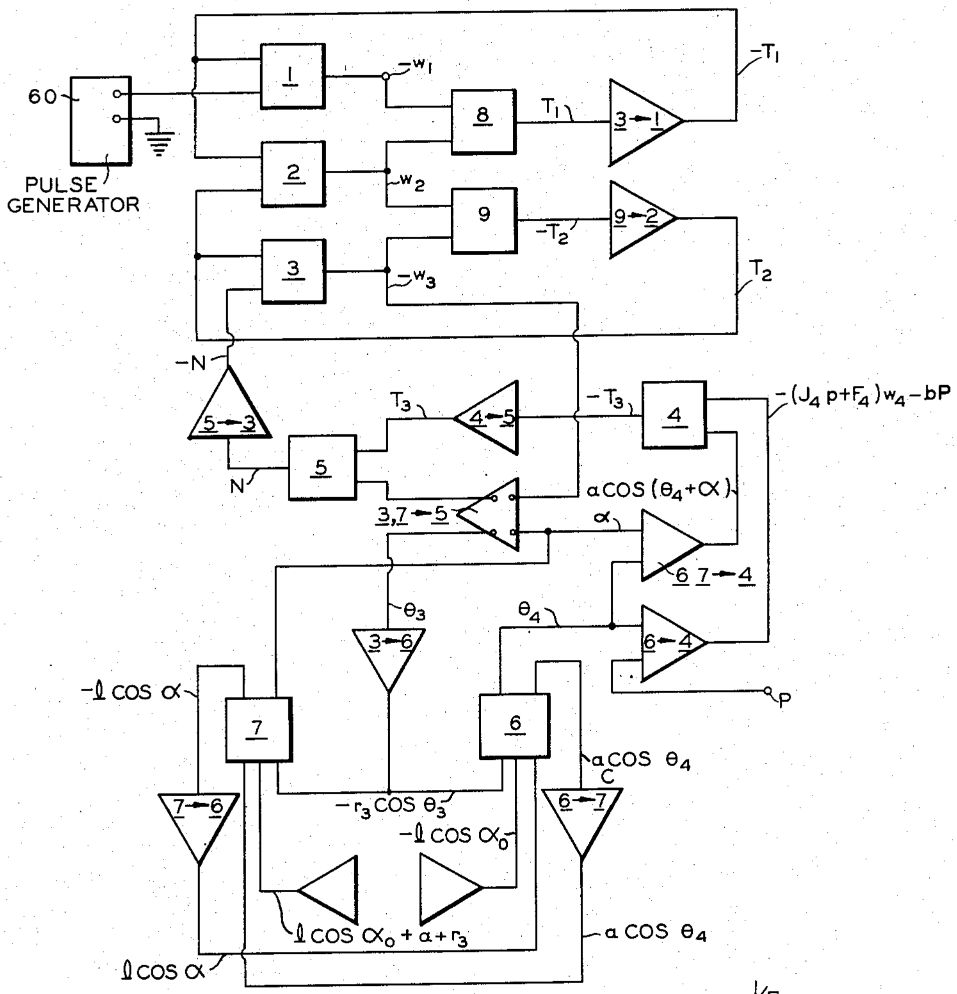
Figure 11 is a block diagram of the simulator for the drive mechanism.

In constructing the simulator, I provide a unit for producing an output in accordance with each of the A group of equations. Each variable is fed to as many units as required as an output without disturbing the linearity of the circuit from which the output is taken. The output P represents the force applied to the polished rod 23 taking into account the reaction of the downhole apparatus shown in the drive mechanism. In the following discussion, therefore, it will be assumed that outputs are supplied as needed to the respective equation units and these outputs will be actually supplied by the coupling units to be described after the individual equation units are set forth. Figure 11 illustrates the manner in which the various equation units are connected together by the coupling units.

Figure 12:
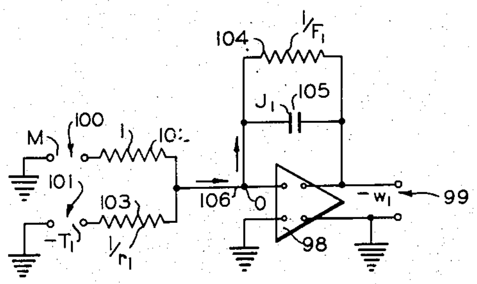

Unit 1, which produces the output $\omega_1$, Equation 57A, is shown in Figure 12 as including a high gain amplifier 98 having a set of output terminals 99 and two sets 100, 101 of input terminals, input terminals 100 being connected to the amplifier input circuit by a unit resistance 102 and input terminals 101 being connected to the input circuit by a resistance 103 of ohmic value $$\frac{1}{r_1}$$

The amplifier has a feedback resistance 104 of ohmic value $$\frac{1}{F_1}$$

which is shunted by a condenser 105 of capacitance $J_1$. The action of the amplifier is such as to drive the voltage at point 106 substantially to zero potential. Accordingly, a current $$\frac{M}{1}$$

passes through resistance 102 and a current $-T_1r_1$ passes through resistance 103. This total current $M-T_1r_1$ through O divides and flows through resistance 104 shunted by condenser 105, the respective currents through these components being $F_1\omega_1$, $J_1p\omega_1$, where $p$ represents the operator $$\frac{d}{dt}$$

Accordingly, the expression $M-T_1r_1$, is equal to the expression $(J_1p+F_1)\omega_1$ which is equivalent to Equation 57A.

Figure 13:
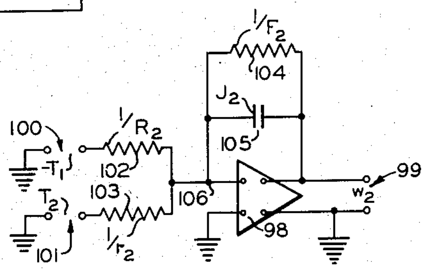

The same circuit is utilized to provide the variable $\omega_2$ of unit 2 except that the circuit components have the values indicated in Figure 13 rather than the values indicated in Figure 12. By comparison of the two circuits it will be readily apparent that the output $\omega_2$ of unit 2 is equivalent to Equation 58A. In similar fashion, the circuit of Figure 12 is used in unit 3, Figure 14, to provide the output $\omega_3$, the circuit components having the values shown in Figure 14 rather than the values shown in Figure 12 or 13. From a comparison of the circuits, it will be evident that the output $\omega_3$ of the circuit of Figure 14 satisfies Equation 59A.

Figures 14, 15, 16:
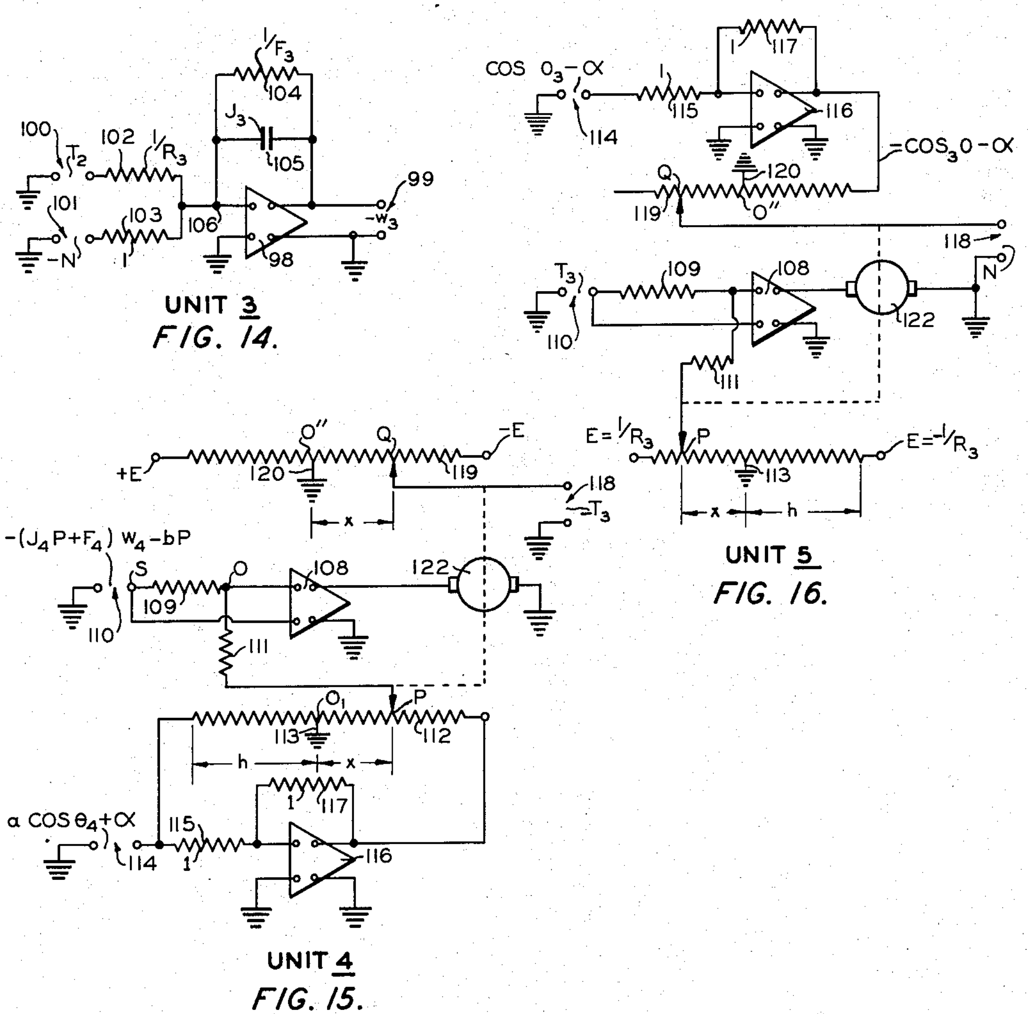

The circuit of unit 4 is shown in Figure 15. This circuit includes a high gain amplifier 108 having its input terminals connected in shunt with a fixed resistor 109, one terminal of which is connected to one of a set of input terminals 110, the other terminal of this set being grounded. The other terminal of resistance 109 is connected through a resistance 111 to the contact of a potentiometer 112 having a grounded center tap 113. One fixed terminal of potentiometer 112 is connected to one of a set 114 of input terminals, the other terminal of the set being grounded and said fixed terminal is also connected through a unit resistance 115 to the input circuit of a high gain amplifier 116 having a unit feedback resistance 117. The output of the amplifier 116 is fed to the other fixed terminal of the potentiometer. A set of output terminals 118 are connected to the contactor of a potentiometer 119 which has a grounded center tap 120 and which is shunted by a battery, not shown, having an electromotive force of two units. The output of amplifier 108 drives a servomotor 122 which is mechanically connected to the contactors of both potentiometers 112 and 119.

In operation, assuming the indicated inputs are applied to inputs 110 and 114, amplifier 108 drives motor 122 until the contactor of potentiometer 112 reaches a point P where its voltage is equal to the voltage at point S. When this occurs, the motor stops and the following equation follows from the indicated relationships between the potentials at the potentiometer contactor and terminals.

$$(J_4p+F_4)\omega_4-bP=\frac{x}{h}a\cos(\theta_4+\alpha) \quad \text{Eq. (66)}$$

At the same time, contact Q is also positioned at the distance $x$ from the midpoint of potentiometer 119 with the result that the potential across terminals 118 is $$-\frac{x}{h}E$$

When the value of $$\frac{x}{h}$$

is substituted in this expression from Equation 66, the Equation 60A is satisfied. The function of the amplifier 116 and unit resistances 115, 117, is to change the sign of the voltage applied to its input terminals so that either negative or positive potentials may be obtained from the potentiometer depending upon the sign of the voltage impressed upon terminals 110. Similarly, since potentiometer 119 has its midpoint grounded permits either positive or negative output voltages to be withdrawn from output terminals 118.

The circuit for producing the output N of unit 5 is similar to that of Figure 15 and is shown in Figure 16, it being understood that the circuit components having the values shown in Figure 16 rather than the values shown in Figure 15. Upon comparing the operation of the two circuits, it will be evident that the output N of Equation 61A is produced by the circuit of Figure 16 when the indicated potentials are applied to input terminals 110 and 114.

Figure 17:
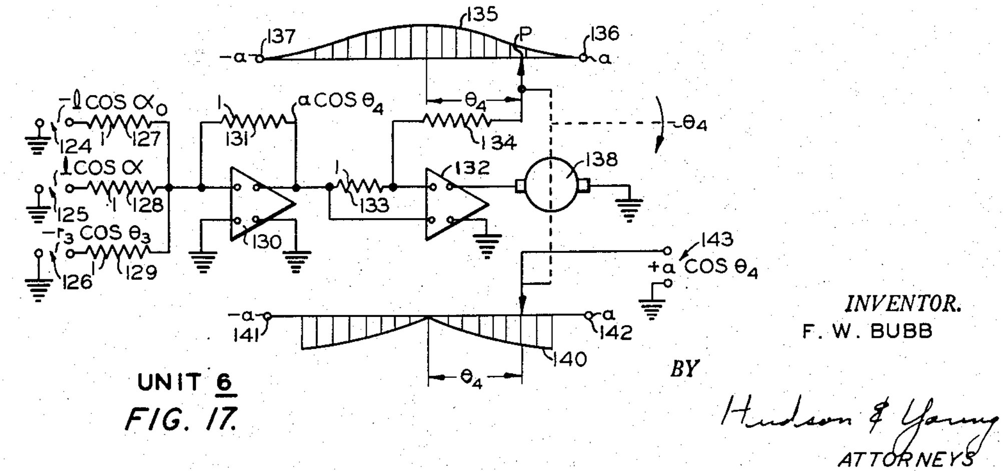

The output $\theta_4$ of Equation 62A is produced by unit 6 shown in Figure 17. In this circuit, three sets of input terminals 124, 125 and 126 are connected, respectively, through unit resistances 127, 128 and 129 to the input circuit of a high gain amplifier 130 having a unit feedback resistance 131. Amplifier 130 adds the indicated inputs appearing at inputs 124, 125 and 126 and applies the sum of these inputs to a high gain amplifier 132 through a unit resistance 133. The junction between the amplifier input and resistance 133 is connected through a unit resistance 134 to the contactor of a sine potentiometer 135 having the indicated voltages applied to its fixed terminals 136 and 137, the contactor being driven by a servomotor 138 which receives the output of amplifier 132. Accordingly, the motor 138 moves the contactor of potentiometer 135 to a position P where the sine of angle $\theta_4$ is equal to the sum of the inputs fed to amplifier 132 through resistance 133. Thus, the angle $\theta_4$ satisfying Equation 62A appears as a shaft rotation of the contactor of potentiometer 135. The motor 138 also drives the contactor of a cosine potentiometer 140 to a position Q representing the angle $\theta_4$, this potentiometer having the indicated voltages supplied to its fixed terminals 141 and 142. As a result, the voltage $a\cos\theta_4$ appears across output terminals 143.

Figure 18:
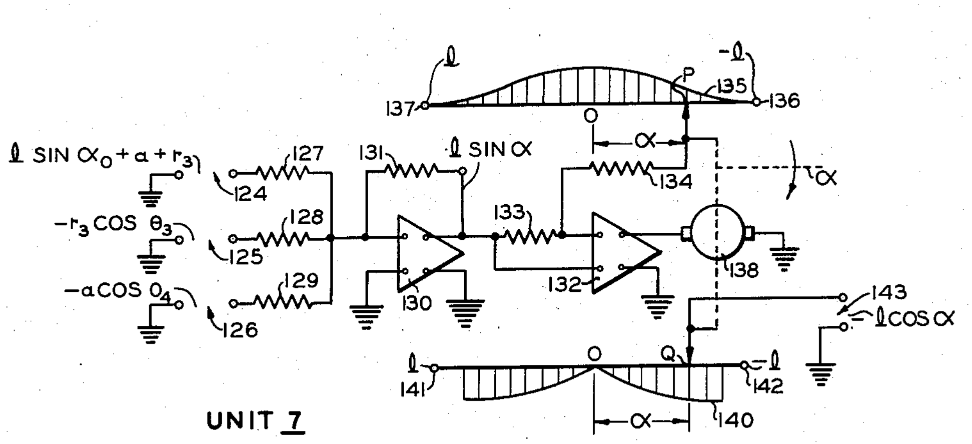

The same circuit is utilized in unit 7, Figure 18, to produce the output $\alpha$ of Equation 63A, it being understood that the circuit components have the values indicated by Figure 18 rather than the values indicated by Figure 17. When the indicated voltages are applied to terminals 124, 125 and 126, the output $\alpha$ is produced as a shaft rotation of the contactor of potentiometer 135 and the output $-l\cos\alpha$ appears across output terminals 143.

Figure 19:
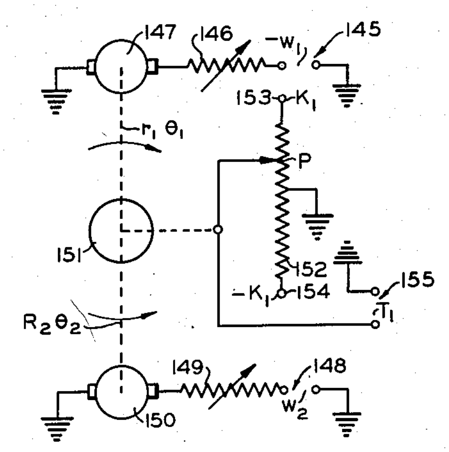

The output $T_1$ of Equation 64A is produced by the circuit of Figure 19, unit 8. In this circuit, a set of input terminals 145 is connected in series with a variable resistance 146 and a rate servomotor 147 so that the motor can be adjusted till its speed is $r_1\omega_1$, when the input $-\omega_1$ is applied to terminals 145. A second set of input terminals 148 is connected in series with a variable resistance 149 and a rate servomotor 150 so that the speed of this motor can be adjusted to represent $-R_2\omega_2$, when a voltage $\omega_2$ is applied to terminals 148. As a result, the shaft rotation of motor 147 is $r_1\theta_1$ and the rotation of the shaft of motor 150 is $R_2\theta_2$. These shaft rotations are added by a differential 151 which drives the contactor of a potentiometer 152 having a grounded center tap, a voltage $K_1$ being applied to a fixed terminal 153 of this potentiometer and a voltage $-K_1$ being applied to the other fixed terminal 154 of the potentiometer. As a result, a voltage $T_1$ satisfying Equation 64A appears at output terminals 155 which are fed by the contactor of the potentiometer. The circuit of Figure 20, unit 9, is similar to that of Figure 19 except that the circuit components have the values indicated in Figure 20 rather than those indicated by Figure 19. Accordingly, when the indicated inputs are fed to terminals 145, 148, an output $-T_2$ satisfying Equation 65A appears at the terminals 155.

In this fashion, the outputs of all the equation units are provided assuming that each unit receives the inputs specified in Figures 12 to 20, inclusive. The manner in which the various outputs are supplied to the proper units is shown in the block diagram, Figure 11, and these units are arranged as shown in Figure 11 together with the coupling circuits now to be described.

The inputs required for unit 1 are M and $-T_1$. The potential M is supplied by a pulse generator 160, the wave form of the pulse produced by the generator representing the driving torque on the motor as a function of time, which may be readily accomplished in the case of an electrical motor. Where a gasoline or diesel engine is used, the pulse generator produces a wave representative of the indicator diagram of the engine translated into terms of torque. The voltage from the pulse generator is supplied to unit 1. Unit 1 also requires, as an input, the quantity $-T_1$. This input is produced by transforming the output $T_1$ appearing at the terminals 155 of unit 8, Figure 19, by the coupling unit 8→1 of Figure 21. This unit includes a high gain amplifier 161 having an odd number of stages to which the input $T_1$ is applied from input terminals 162 through a unit resistance 163, the amplifier being shunted by a unit feedback resistance 164. As a result, the quantity $-T_1$ appears at output terminals 165 as a powered output and is fed to the proper terminals of unit 1. Thus, the amplifier produces all the power needed to supply unit 1 but no appreciable input current is drawn by this amplifier to disturb the linearity of the circuits of unit 8.

Figure 20:
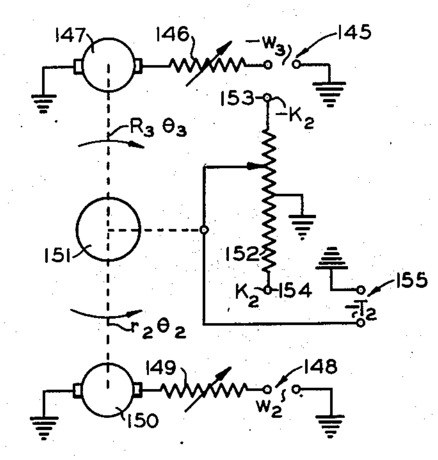
Figure 21:
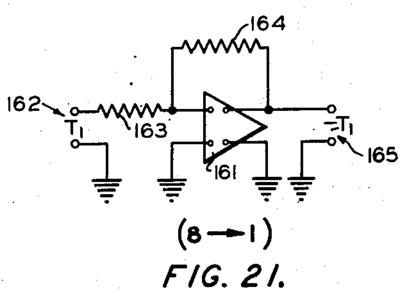
Figure 22:
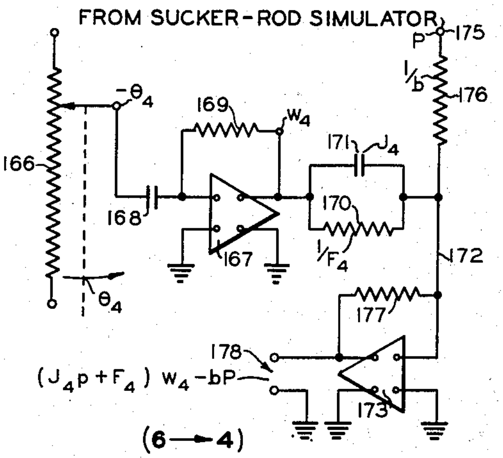

The inputs required for unit 2 are $-T_1$ and $T_2$ The input $-T_1$ is supplied to terminals 100 from terminals 165 of coupling unit 8→1, Figure 21. A similar coupling unit 9→2, Figure 11, is of identical structure with the circuit of Figure 21 and this unit transforms the outputs appearing at terminals 155, Figure 20, into the input $T_2$ required at the terminals 101, unit 2, Figure 13.

The inputs required for unit 3 are $T_2$ and $-N$. The potential $T_2$ is provided by coupling unit 9→2 which has just been described and the input $-N$ for terminals 101 of unit 3, Figure 14, is supplied by a coupling unit 5→3, Figure 11, of identical construction to coupling unit 8→1, Figure 21, this unit transforming the output N appearing at terminals 118, unit 5, Figure 16, to the required input $-N$.

The inputs required by unit 4, Figure 15 are $-(J_4p+F_4)\omega_4-bP$ and $a\cos.(\theta_4+\alpha)$. The first input is provided by coupling unit 6→4, Figure 22. The output $\theta_4$ of unit 6, Figure 17, appears as a shaft rotation. The rotating shaft is coupled to the contactor of a potentiometer 166 supplied with a unit voltage across its fixed terminals, thus producing a potential $-\theta_4$ at the contactor of the potentiometer. The contactor is coupled to a high gain amplifier 167 through a unit capacitance 168, the amplifier being provided with a unit feedback resistance 169. Accordingly, the amplifier circuit differentiates the voltage appearing at its input terminals, thus yielding an output $\omega_4$. This output is passed through a parallel network consisting of a resistance 170 of ohmic value $$\frac{1}{F_4}$$

and a condenser 171 of ohmic value $J_4$. Thus, a conductor 172 connected to the input circuits of a high gain amplifier 173 receives, from this network, a current $-J_4p\omega_4$ from condenser 171 and a current $-F_4\omega_4$ from resistance 170. A terminal 175 is connected to the top of the rod line of the simulator unit of Figure 2 and thus receives a voltage P representing the action of the downhole pumping unit. The voltage applied from coupling unit 6→4 to terminal 175, in turn, is representative of the driving force applied to the top of the sucker rod string by the drive mechanism simulator unit. Thus, at point P, the driving effect of the simulator is transmitted to the sucker rod simulator and the reaction of the sucker rod simulator is transmitted to the driving mechanism simulator. Terminal 175 is connected to conductor 172 by a fixed resistance 176 of ohmic value $$\frac{1}{b}$$

so that, when the voltage at conductor 172 is driven substantially to zero by the action of unit feedback resistance 177, the conductor 172 receives a voltage $bP$ from resistor 176. The current flowing through condenser 171 and fixed resistances 170, 176 are added by amplifier 173, the output of which produces the indicated voltage across terminals 178 for application to the input terminals 110 of unit 4, Figure 15.

Figure 23:
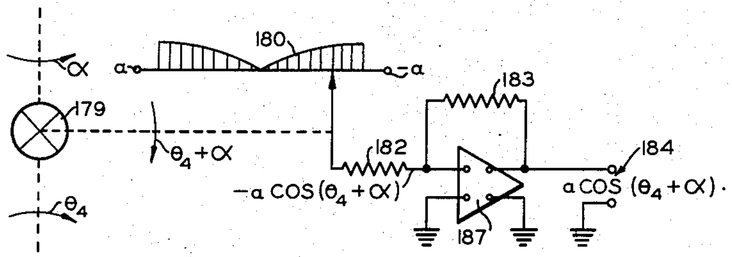

The input $a\cos.(\theta_4+\alpha)$ for the input terminals 114 of unit 4 is produced by coupling unit 6, 7→4, Figure 23. This unit includes a mechanical differential 179 which produces a shaft rotation equal to the sum of the shaft rotation $\alpha$ appearing as an output of unit 7, Figure 16, and the shaft rotation $\theta_4$ appearing as an output of unit 6, Figure 17. The mechanical differential is connected to the contactor of a cosine potentiometer 180 having voltages $a$ and $-a$ supplied to the respective fixed terminals thereof. As a result, an output voltage $-a\cos.(\theta_4+\alpha)$ is generated which, through the medium of a sign changing unit including a high gain amplifier 181, a unit input resistance 182, and a unit feedback resistance 183, is converted into the required input voltage appearing at output terminals 184 which are connected to the terminals 114 of unit 4, Figure 15.

The inputs required for unit 5, Figure 16, are $T_3$ and $\cos.(\theta_3-\alpha)$. A coupling unit 4→5, Figure 11, of identical construction to coupling unit 8→1, Figure 21, transforms a voltage $-T_3$ appearing at output terminals 118 of unit 4, Figure 18, to the voltage $T_3$ required at the input terminals 110 of unit 5, Figure 16. The input for terminals 114 is produced by a coupling unit 3, 7→5, Figure 24, including a mechanical differential 185 having the shaft rotation $\alpha$ from the output of unit 7, Figure 16, applied to one side thereof. The coupling unit also has a set of input terminals 186 which receive an input $-\omega_3$ from the terminals 99 of unit 3, Figure 14. The voltage fed to terminals 186 is passed through a variable resistance 187 to a rate servomotor which is adjusted to rotate at a speed $\theta_3$ by proper adjustment of variable resistance 187, this servomotor, in effect, transforming the electrical quantity representing velocity into a mechanical shaft rotation representing displacement. The output of differential 185 is fed to a continuous cosine potentiometer 189 which produces an output $-\cos.(\theta_3-\alpha)$ which, after passing through a sign changing unit comprising a high gain amplifier 190, a unit input resistance 191 and a unit feedback resistance 192, appears as the proper output at terminals 193 to be fed to the terminals 114 of unit 5, Figure 16.

Figure 24:
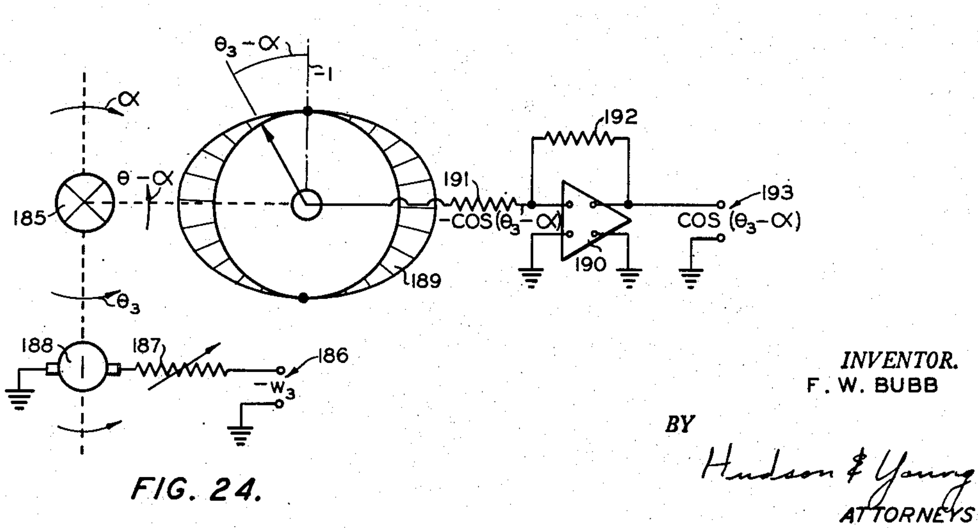

The inputs required for unit 6, Figure 17, are indicated at terminals 124, 125 and 126 on this figure. A sign changer of identical construction to unit 8→1, Figure 21, and designated 7→6 in Figure 11 converts the voltage $-l \cos.\alpha$ appearing at terminals 143 of unit 7, Figure 16, to the required voltage to be fed to terminals 125 of unit 6, Figure 17. The voltage $-l \cos.\alpha$ is a constant voltage and may be supplied directly to terminals 125 by any suitable source. Preferably, the negative of this voltage is produced across a potentiometer and fed through a sign changer to the terminals 124 of Figure 17 so that ample power is available to supply the circuit of unit 6, Figure 17. The voltage $-r_3 \cos.\theta_3$ is supplied by coupling unit 3′→6, Figure 25, wherein the shaft rotation $\theta_3$ produced by rate servomotor 188 of coupling unit 3, 7→5, Figure 24, is applied to the contactor of a continuous cosine potentiometer 194, the fixed terminals of which are supplied with voltages $r_3$ and $-r_3$, respectively. This produces a voltage $r_3 \cos.\theta_3$ at the contactor of the potentiometer which, through the medium of a sign changer including an amplifier 195, a unit input resistance 196, and a unit feedback resistance 197, produces the required output voltage at terminals 198 for application to the terminals 126 of unit 6, Figure 17.

Figure 25:
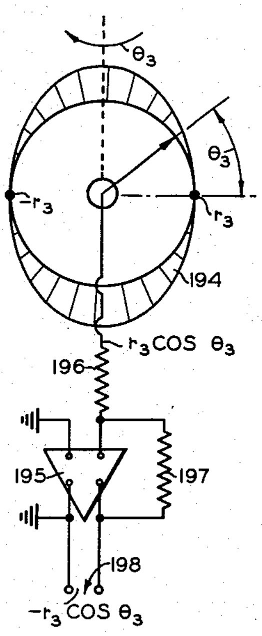

In regard to the inputs required for unit 7, Figure 18, the required input for terminals 125, that is, $-r_3 \cos.\theta_3$ is available at the terminals 198 of coupling unit 3′→6, Figure 25. The input $-a \cos.\theta_4$ for terminals 126 is taken from terminals 143 of unit 6, Figure 17, a sign changer or coupling unit 6→7 of identical construction with the coupling unit 8→1, Figure 21, being provided to change the sign of the voltage in the required manner. The input required for terminals 124 is a constant and may either be supplied directly to the terminals or, alternatively, the negative of the required voltage may be produced at the contactor of a potentiometer and this voltage fed through a sign changer unit to provide adequate power for operating the circuits of unit 7, Figure 16. The input $-\omega_1$ for terminals 145 of unit 8, Figure 17, is supplied directly from the terminals 99 of unit 1, Figure 12.

The input $\omega_2$ for the terminals 148 of unit 8, Figure 19, is supplied directly from the terminals 99 of unit 2, Figure 13, adequate power being available at both sets of output terminals to supply the circuits of units 8 and 9. The input $-\omega_3$ for terminals 145 of unit 9, Figure 20, is supplied directly from the terminals 99 of unit 3, Figure 14. Finally, the input $\omega_2$ for terminals 148 of unit 9, Figure 20, is supplied directly from terminals 99 of unit 2, Figure 13, adequate power being available at both sets of output terminals to supply the circuits of Figure 20.

In this manner, the inputs are supplied to each equation unit by the described coupling circuits with adequate power to operate the units thus supplied. Furthermore, no current is drawn from the equation units which supply outputs to other units through the coupling devices. The voltages and currents in the system of Figure 11 satisfy the differential equations of motion (Equations 57 to 65) of the drive mechanism for the pumping unit and, hence, the voltage impressed at the top of the rod line of Figure 2 reflects the effect of the drive mechanism for the pumping system. Furthermore, the voltages appearing at the top of the rod line in the operation of the sucker rod simulator are reflected into the circuits of the drive mechanism simulator so that the reaction of the pumping system shown in drive mechanism is accurately taken into account. When connected together in the manner already described, the two systems provide apparatus which is an electrical analogue of the entire pumping system including the drive mechanism, the downhole pumping unit, the rod and tubing strings, and the oil columns both between the sucker rod and tubing and between the casing and tubing.

While the invention has been described in connection with present, preferred embodiments thereof, it is to be understood that this description is illustrative only and is not intended to limit the invention, the scope of which is defined by the appended claims.

I claim:

1. In apparatus for electrically simulating a segment of a downhole pumping unit including a tubing segment, a rod segment, and an oil column segment, in combination, an electrical line for each of said segments, each line including a condenser representing displacement of the segment, an inductance representing the inertia of the segment, and a voltage source representing the weight of the segment, a resistance in the rod line, a resistance in the tubing line, a pair of resistors in the oil line, a coupling circuit interconnecting one of said pair of resistors and the tubing line resistance to simulate viscous drag between the tubing segment and the oil column segment, a coupling circuit interconnecting the other of said pair of resistors and the rod line resistance to simulate viscous drag between the rod segment and the oil column segment, and a rectifier connecting the oil line to a point maintained at a reference potential to prevent the oil line voltage from falling below said reference potential.

2. In apparatus for electrically simulating a segment of a downhole pumping unit including a tubing segment, a rod segment, and an oil column segment, in combination, an electrical line for each of said segments, each line including a condenser representing displacement of the segment, an inductance representing the inertia of the segment, and a voltage source representing the weight of the segment, a resistance in the rod line, a resistance in the tubing line, a pair of resistors in the oil line, a coupling circuit interconnecting one of said pair of resistors and the tubing line resistance to simulate viscous drag between the tubing segment and the oil column segment, a coupling circuit interconnecting the other of said pair of resistors and the rod line resistance to simulate viscous drag between the rod segment and the oil column segment, and a second resistance in the tubing line representative of the friction of a stationary body of oil outside the tubing segment.

3. In apparatus for electrically simulating a downhole pumping system including a sucker rod string, tubing surrounding said sucker rod string, an oil column between said rod and said tube, and a pump at the bottom of said system, in combination; a plurality of units, one for each segment of the pumping system, each unit including an electrical line simulating each of a tubing segment, a rod segment, and an oil column segment, respectively, each of said lines including a condenser representing displacement of the segment, an inductance representing the inertia of the segment, and a voltage source representing the weight of the segment each of said units further including a resistance in the rod line and a resistance in the tubing line, a pair of resistors in the oil line, a coupling circuit interconnecting one of said pair of resistors and the tubing line resistance to simulate viscous drag between the tubing segment and the oil column segment, a coupling circuit interconnecting the other of said pair of resistors and the rod line resistance to simulate viscous drag between the rod segment and the oil column segment, and a rectifier connecting each segment of the oil line to a point maintained at a reference potential to prevent the oil line voltage from falling below said reference potential; means connecting corresponding lines in each of said units in series relation to simulate operation of said downhole pumping system; and means connected to the line simulating the uppermost rod segment for simulating the driving mechanism at the top of the pumping system; and means interconnecting the lines simulating the lowermost rod, tubing and oil column segments for simulating the operation of the pump at the bottom of said system.

4. Apparatus for producing the effect of an ideal transformer which comprises, in combination, a pair of electrical lines each including an impedance, means for causing a current to flow through each of said impedances, a high gain amplifier having its input circuit connected through a coupling impedance across one of said line impedances and its output applied across the other line impedance, a second high gain amplifier having its input circuit connected through a second coupling impedance across the other line impedance and its output applied across said first line impedance, and a feedback resistance connected in circuit with each of said high gain amplifiers, each of said coupling impedances and said feedback resistors being of equal ohmic value.

5. A simulator for a pumping unit driving mechanism including a prime mover, a flywheel, a crank, a walking beam driven through a pitman by the crank, and means connecting the prime mover to the flywheel and the flywheel to the crank, which comprises, in combination, a plurality of means for combining mechanical and electrical quantities as dictated by the differential equations of motion and spatial relationships of the components of the drive mechanism so as to produce outputs representative of the system variables, means for applying a driving voltage representing prime mover characteristics to one of said plurality of means, means for feeding said outputs as powered inputs to said plurality of means where such outputs are required, and means for applying a voltage representing the reaction of a downhole pumping unit to one of said plurality of means, the resulting voltage at said point of application of said last-named voltage simulating the driving force of said mechanism.

6. A simulator for a pumping unit driving mechanism including a prime mover, a flywheel, a crank, a walking beam driven through a pitman by the crank, and means connecting the prime mover to the flywheel and the flywheel to the crank, which comprises, in combination, a plurality of means for combining mechanical and electrical quantities as dictated by the differential equations of motion and spatial relationships of the components of the drive mechanism so as to produce outputs representative of the angular velocity of the prime mover, flywheel, and crank, the tension in said connecting means and said pitman, the torque produced by the crank and the angular position of the walking beam and pitman, means for applying a driving voltage representing prime mover characteristics to one of said plurality of means, means for feeding said outputs as powered inputs to said plurality of means where such outputs are required, and means for applying a voltage representing the reaction of a downhole pumping unit to one of said plurality of means, the resulting voltage at said point of application of said last-mentioned voltage simulating the driving force of said mechanism.

7. A simulator for a pumping system comprising driving mechanism which includes a prime mover, a walking beam, and means connecting said prime mover in driving relationship to said walking beam, said pumping unit including a sucker rod string driven by the walking beam, tubing surrounding said sucker rod string, and a column of oil between said tubing and said sucker rod string, in combination, a plurality of means for combining mechanical and electrical quantities as dictated by the differential equations of motion and spatial relationships of components of the drive mechanism so as to produce outputs representative of the system variables, means for applying a driving voltage representing prime moving characteristics to one of said units, means for feeding said outputs as powered inputs to said plurality of means where such outputs are required, a first electrical circuit whose parameters are representative of the variables and the constants of the downhole pumping unit, a second electrical circuit for simulating the operation of a pump mounted at the bottom of said tubing, means for simulating connection of said tubing to ground at the surface of the well, means for simulating the constant pressure at which oil is discharged from the top of the well, and means for applying the output of one of said plurality of means to said first electrical circuit so that said first circuit is driven by a voltage corresponding to the action of the drive mechanism, said first circuit, in turn, producing an electrical reaction upon the plurality of means of the driving mechanism.

8. A simulator for a pumping unit driving mechanism including a prime mover, a flywheel, a crank, a walking beam driven through a pitman by the crank, and means connecting the prime mover to the flywheel and the flywheel to the crank, which comprises, in combination; a plurality of means for combining mechanical and electrical quantities as dictated by the differential equations of motion and spatial relationships of the components of the drive mechanism so as to produce outputs representative of the angular velocity of the prime mover, flywheel, and crank, the tension in said connecting means and said pitman, the torque produced by the crank, and the angular position of the walking beam and pitman, means for applying a driving voltage representing prime mover characteristics to one of said units, and means for feeding said outputs as powered inputs to said plurality of means where such outputs are required; apparatus for electrically simulating a downhole pumping system including a sucker rod string, tubing surrounding said sucker rod string, and an oil column between said rod and said tube, said apparatus comprising, in combination, a plurality of simulator units, one for each segment of the pumping system, each unit including an electrical line for each of a tubing segment, a rod segment, and an oil column segment, each line including a condenser representing displacement of the segment, an inductance representing the inertia of the segment, and a voltage source representing the weight of the segment, a resistance in the rod line and the tubing line, a pair of resistors in the oil line, a coupling circuit interconnecting one of said pair of resistors and the tubing line resistance to simulate viscous drag between the tubing segment and the oil column segment, a coupling circuit interconnecting the other of said pair of resistors and the rod line resistance to simulate viscous drag between the rod segment and the oil column segment, and a rectifier connecting the oil line to a point maintained at a reference potential to prevent the oil line voltage from falling below said reference potential; a unit for simulating the end conditions at the top of the pumping system; a unit for simulating the operation of the pump at the bottom of said system; and a coupling circuit connecting one of said circuit units to the line representing the top segment of the sucker rod.

9. The combination in accordance with claim 1 wherein said first-mentioned coupling circuit comprising a transformer having one winding thereof connected across the resistance in the tubing line and the second winding thereof connected across one of said pair of resistors, and wherein said second-mentioned coupling circuit comprises a transformer having one winding thereof connected across the resistance in the rod line and the second winding thereof connected across said other resistor.

10. In apparatus for electrically simulating a downhole pumping unit including a tubing segment, a rod segment, and an oil column segment, in combination, an electrical line for each of said segments, each line including a condenser representing displacement of the segment, an inductance representing the inertia of the segment, and a voltage source representing the weight of the segment, a resistance in the rod line, a resistance in the tubing line, a pair of resistors in the oil line, a coupling circuit interconnecting one of said pair of resistors and the tubing line resistance to simulate viscous drag between the tubing segment and the oil column segment, a coupling circuit interconnecting the other of said pair of resistors and the rod line resistance to simulate viscous drag between the rod segment and the oil column segment, and a voltage limiting circuit to maintain the magnitude of the voltage on the oil line within preselected limits whereby the voltage on said oil line is prevented from assuming a value outside of said preselected limits representative of tension in the oil column.

11. The combination in accordance with claim 3 wherein said means connected to the rod line simulating the uppermost rod segment comprises a generator connected to the rod line for producing a driving voltage representative of the force of the driving mechanism at the top of the pumping system, and further comprising a voltage source connected to the line simulating the uppermost oil column segment to simulate the pressure at which oil is discharged from the tubing.

12. The combination in accordance with claim 3 wherein said pump includes a plunger, a traveling valve and a stationary valve; wherein said last-mentioned means comprises a voltage source simulating the weight of said stationary valve, an inductance simulating the inertia of said valve, and a primary winding of a first transformer connected in series relation with the line simulating the lowermost rod segment; a voltage source simulating the weight of said traveling valve and plunger, an inductance simulating the inertia of said traveling valve and plunger, and a primary winding of a second transformer connected in series relation with the line simulating the lowermost tubing segment; a voltage source connected in series relation with the parallel-connected secondary windings of said first and second transformers and with the line simulating the lowermost oil column segment whereby the current supplied to the secondary windings of said transformers simulates the velocity of an oil column above said traveling valve, said last-mentioned voltage source simulating the stress of an oil column above said traveling valve, the turns ratio of the primary and secondary windings of said first transformer being the ratio between the cross-sectional area of said rod and the cross-sectional area of said oil column, the turns ratio of the primary and secondary windings of said second transformer being the ratio between the sum of the cross-sectional areas of said sucker rod and oil column and the cross-sectional area of said oil column; and means for preventing current flow through said transformers during periods representing the upstroke of said pump.

13. Apparatus for simulating a downhole pump including a plunger, a traveling valve and a stationary valve comprising, in combination; a voltage source simulating the weight of said stationary valve, an inductance simulating the inertia of said valve, and a primary winding of a first transformer connected in series relation; a voltage source simulating the weight of said traveling valve and plunger, an inductance simulating the inertia of said traveling valve and plunger, and a primary winding of a second transformer connected in series relation; a voltage source connected in circuit with the parallel-connected secondary windings of said first and second transformers whereby the current supplied to the secondary windings of said transformers simulates the velocity of an oil column above said traveling valve, said last-mentioned voltage source simulating the stress of an oil column above said traveling valve, the turns ratio of the primary and secondary windings of said first transformer being the ratio between the cross-sectional area of said rod and the cross-sectional area of said oil column, the turns ratio of the primary and secondary windings of said second transformer being the ratio between the sum of the cross-sectional areas of said sucker rod and oil column and the cross-sectional area of said oil column; and means for preventing current flow through said transformers during periods representing the upstroke of said pump.

14. The combination in accordance with claim 13 wherein said means comprises a first rectifier connected in series with said first-mentioned voltage source, said first-mentioned inductance and the primary winding of said first transformer to prevent current flow therethrough during periods representing the upstroke of said pump; a second rectifier connected between said first-mentioned circuit and said third-mentioned voltage source to permit current flow therebetween during periods representing the upstroke of said pump; a third rectifier connected between the secondary windings of said first and second transformers to prevent current flow therebetween during periods representing the upstroke of said pump; and a fourth rectifier connected between said third-mentioned voltage source and the parallel-connected secondary windings of said first and second transformers to prevent current flow therebetween during periods representing the upstroke of said pump.

15. An electrical circuit for producing the effect of an ideal transformer comprising, in combination, a pair of electrical lines each having a resistor connected therein, means for establishing a current flow through each of said resistors, a first high gain amplifier, a first coupling resistor, circuit means connecting one input terminal of said first amplifier to one end terminal of the resistor in the first of said lines through said first coupling resistor, circuit means connecting the second input terminal of said first amplifier to the second end terminal of the resistor in the first of said lines, circuit means connecting the output terminals of said first amplifier across the end terminals of the resistor in the second of said lines, a first feedback resistor connected between the output and input circuits of said first amplifier, a second high gain amplifier, a second coupling resistor, circuit means connecting one input terminal of said second amplifier to one end terminal of the resistor in the second of said lines through said second coupling resistor, circuit means connecting the second input terminal of said second amplifier to the second end terminal of the resistor in the second of said lines, circuit means connecting the output terminals of said second amplifier across the end terminals of the resistor in the first of said lines, and a second feedback resistor connected between the output and input circuits of said second amplifier. each of said coupling resistors and said feedback resistors being of equal ohmic value.

FRANK WM. BUBB.

References Cited in the file of this patent

UNITED STATES PATENTS

| Number | Name | Date |
|---|---|---|
| 2,424,236 | Huge | July 22, 1947 |
| 2,454,549 | Brown et al. | Nov. 23, 1948 |
| 2,516,000 | Harder | July 18, 1950 |

FOREIGN PATENTS

| Number | Country | Date |
|---|---|---|
| 703,883 | Germany | Mar. 18, 1941 |